(12) United States Patent
Yano et al.

(10) Patent No.: US 6,534,025 B1
(45) Date of Patent: Mar. 18, 2003

(54) POROUS MATERIALS AND METHODS FOR FORMING THE SAME

(75) Inventors: Kazuhisa Yano, Aichi (JP); Yuri Sasaki, Aichi (JP); Tadashi Nakamura, Aichi (JP); Mitsumasa Horii, Aichi (JP); Yoshiaki Fukushima, Aichi (JP); Hideaki Sato, Anjo (JP)

(73) Assignees: Kabushiki Kaisha Toyota Chuo Kenkyusho, Aichi-gun (JP); Denso Corporation, Kariya (JP)

( * ) Notice: Subject to any disclaimer, the term of this patent is extended or adjusted under 35 U.S.C. 154(b) by 0 days.

(21) Appl. No.: 09/666,136

(22) Filed: Sep. 20, 2000

(30) Foreign Application Priority Data

Sep. 20, 1999 (JP) .......................................... 11-266136
Sep. 19, 2000 (JP) ........................................ 2000-284216

(51) Int. Cl.$^7$ ............................................. C01B 33/12
(52) U.S. Cl. ..................................................... 423/335
(58) Field of Search ............................... 423/335, 338, 423/339, 700, 705, 702, 704, 707

(56) References Cited

U.S. PATENT DOCUMENTS

| | | | |
|---|---|---|---|
| 5,143,879 A | * 9/1992 | Whitehurst ................... | 502/85 |
| 5,256,277 A | 10/1993 | Del Rossi et al. | |
| 5,334,368 A | 8/1994 | Beck et al. | |
| 5,382,558 A | 1/1995 | Inagaki et al. | |
| 5,508,081 A | 4/1996 | Inagaki et al. | |
| 5,565,142 A | * 10/1996 | Deshpande et al. ...... | 252/315.2 |
| 5,707,598 A | 1/1998 | Inagaki et al. | |
| 5,750,085 A | 5/1998 | Yamada et al. | |
| 5,768,910 A | 6/1998 | Inagaki et al. | |
| 5,922,299 A | * 7/1999 | Bruinsma et al. ........... | 423/335 |
| 5,958,577 A | * 9/1999 | Sugimoto et al. ........... | 428/333 |
| 6,107,243 A | * 8/2000 | Inagaki et al. .............. | 502/407 |

OTHER PUBLICATIONS

J.S. Beck et al., A New Family of Mesoporous Molecular Sieves Prepared With Liquid Crystal Templates, J. Am. Chem. Society, vol. 114, Nov. 27, 1992, pp. 10834–10843.

Shinji Inagaki et al., Synthesis of Highly Ordered Mesoporous Materials, FSM–16, Derived From Kanemite, Bull. Chem. Soc. Jpn., vol. 69 No. 5 (1996), pp. 1449–1457. No Month.

* cited by examiner

*Primary Examiner*—Stanley S. Silverman
*Assistant Examiner*—Edward M. Johnson
(74) *Attorney, Agent, or Firm*—Oblon, Spivak, McClelland, Maier & Neustadt, P.C.

(57) ABSTRACT

Porous materials having a metal oxide skeleton are taught that have various water vapor adsorption capacities defined by the amount of adsorbed water vapor at a specific relative vapor pressure in a water vapor adsorption isotherm. A preferred porous material has a water vapor adsorption capacity that is less than or equal to 0.1 g/g at a relative vapor pressure of 10%, and greater than or equal to 0.2 g/g at a relative vapor pressure of 28%. Methods of making such porous materials are also taught. A preferred method for forming a porous material includes condensing a skeleton starting material for the porous material, in the presence of a surfactant, in a solution which has a concentration of the skeleton starting material in the solution that is less than or equal to 0.4 mol/L and a molar ratio of the surfactant to the skeleton starting material that is greater than or equal to 0.05 and less than or equal to 50, to form a condensate and removing the surfactant from the condensate.

28 Claims, 3 Drawing Sheets

POROUS MATERIALS AND METHODS FOR FORMING THE SAME

BACKGROUND OF THE INVENTION

1. Field of the Invention

The present invention relates to porous materials, and more specifically, to porous materials comprising silica or similar metal oxides, which have superior water vapor adsorption properties and, in particular, superior water vapor adsorption properties at low vapor pressures.

2. Description of the Related Art

Fine pore silica porous materials having pore diameters of between 1.5 nm–30 nm have been synthesized. For example, J. Am. Chem. Soc., 114, 10834 (1992), U.S. Pat. No. 5,256,277, and U.S. Pat. No. 5,334,368 describe methods for synthesizing silica porous materials using surfactants and a silica sol. Furthermore, Bull. Chem. Soc. Japan, 69, 1449 (1996) describes methods for making silica porous materials using surfactants and layered silicates.

However, in the method described in J. Am. Chem. Soc., 114, 10834 (1992), the surfactants form micelles and the synthesis proceeds using the micelles as a template. Therefore, it is difficult to synthesize silica porous materials having small, fine pores by using octyltrimethylammonium halides and decyltrimethylammonium halides as surfactants, because these surfactants cannot readily form micelles. In addition, in the method described in Chem. Mater., 11, 1110 (1999), synthesis is performed using a surfactant having a concentration that is greater than the critical micelle concentration. Therefore, porous materials with fine pores cannot be obtained, in particular, when octyltrimethylammonium halides are used. Consequently, there is a long felt, but as yet unsatisfied, need for porous materials having small, fine pores that provide high water vapor adsorption capacity at low relative vapor pressures.

SUMMARY OF THE INVENTION

Therefore, one object of the present teachings is to provide improved porous materials. For example, in one aspect of the present teachings, porous materials having fine pores are taught. Further, methods for making such porous materials are also taught.

In another aspect of the present teachings, porous materials having various water vapor adsorption capacities are taught. For example, the following porous materials are taught, which have useful water vapor adsorption capacities defined by the amount of adsorbed water vapor at a specific relative vapor pressure in a water vapor adsorption isotherm:

(1) Less than or equal to 0.1 g/g at a relative vapor pressure of 10%, and greater than or equal to 0.2 g/g at a relative vapor pressure of 28%.

(2) Less than or equal to 0.1 g/g at a relative vapor pressure of 10%, and greater than or equal to 0.25 g/g at a relative vapor pressure of 28%.

(3) Less than or equal to 0.1 g/g at a relative vapor pressure of 20%, and greater than or equal to 0.35 g/g at a relative vapor pressure of 35%.

(4) Less than or equal to 0.1 g/g at a relative vapor pressure of 25%, and greater than or equal to 0.4 g/g at a relative vapor pressure of 40%.

(5) Less than or equal to 0.1 g/g at a relative vapor pressure of 30%, and greater than or equal to 0.48 g/g at a relative vapor pressure of 50%.

(6) Less than or equal to 0.15 g/g at a relative vapor pressure of 40%, and greater than or equal to 0.60 g/g at a relative vapor pressure of 60%.

(7) The difference in the amount of adsorbed water vapor between any two points within a range of relative vapor pressure from greater than or equal to 10% to less than or equal to 28% is greater than or equal to 0.16 g/g, preferably, greater than or equal to 0.18 g/g.

(8) Less than or equal to 0.1 g/g at a relative vapor pressure of 10%, and greater than or equal to 0.2 g/g at a relative vapor pressure of 25%.

(9) The difference in the amount of adsorbed water vapor between any two points within a range of relative vapor pressure from greater than or equal to 10% to less than or equal to 25% is greater than or equal to 0.12 g/g.

(10) Less than or equal to 0.1 g/g at a relative vapor pressure of 8%, and greater than or equal to 0.18 g/g at a relative vapor pressure of 18%.

(11) The difference in the amount of adsorbed water vapor between any two points within a range of relative vapor pressure from greater than or equal to 8% to less than or equal to 18% is greater than or equal to 0.12 g/g.

Throughout this specification, all water adsorption ratios are described in terms of grams of adsorbed water per gram of porous material.

Such porous materials may be preferably utilized, for example, to absorb water in air conditioning systems and more preferably, in air conditioning systems for use in vehicles.

In another aspect of the present teachings, methods for the forming porous materials are also taught. For example, representative methods include condensing a skeleton starting material in the presence of a surfactant and in a solution which has a concentration of the skeleton starting material of less than or equal to 0.4 mol/L and has a molar ratio of the surfactant to the skeleton starting material that is greater than or equal to 0.05 and less than or equal to 50.

Other representative methods include mixing a surfactant and a skeleton starting material in the presence of an aqueous solvent having a pH value of greater than or equal to 10 to form a liquid mixture, reducing the pH of the liquid mixture to a pH value of greater than or equal to 9, and removing the surfactant from a solid fraction that separates from the liquid mixture after reduction of the pH value of the liquid mixture.

These methods can provide porous materials having a uniform fine pore size distribution and a small pore size.

Other representative methods include condensing a skeleton starting material in a solution having a concentration of the skeleton starting material that is less than or equal to 0.4 mol/L and has a molar ratio of a surfactant to the skeleton starting material that is greater than or equal to 0.07 and less than or equal to 25. The surfactant may then be removed from the condensate and the condensate may be contacted with a solution comprising an acid, or with a salt of an acid, and a metal ion having a valence of greater than or equal to 3.

Other representative methods include condensing a skeleton starting material in a solution having a concentration of the skeleton starting material that is less than or equal to 0.4 mol/L and a molar ratio of a surfactant to the skeleton starting material that is greater than or equal to 0.07 and less than or equal to 25. Preferably, the skeleton starting material may contain silicon or aluminum as a metal element. The surfactant may then be removed from the condensate.

Because these representative methods include either (1) contacting the condensate with a solution comprising an acid, or a salt of an acid, and a metal with a valence of greater than or equal to 3, or (2) Si and Al as a metal element in the skeleton starting material, it is possible to obtain porous materials with good moisture resistance.

Additional objects, features and advantages of the present invention will be readily understood after reading the following detailed description together with the accompanying drawings and the claims.

DETAILED DESCRIPTION OF THE INVENTION

Figure 1:
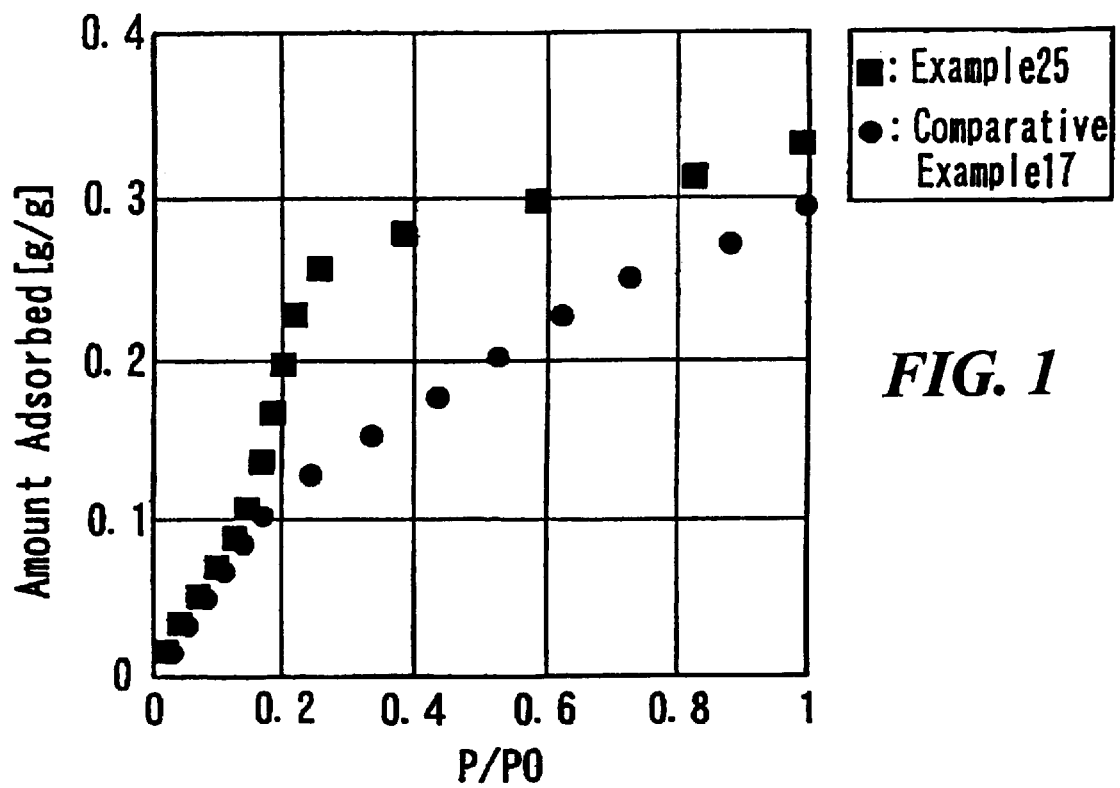
FIG. 1 shows water vapor adsorption isotherm curves of the porous materials of Example 25 and Comparative Example 17.

For example, the following porous materials are taught, which have useful water vapor adsorption capacities defined by the amount of adsorbed water vapor at a specific relative vapor pressure in a water vapor adsorption isotherm:

(1) Less than or equal to 0.1 g/g at a relative vapor pressure of 10%, and greater than or equal to 0.2 g/g at a relative vapor pressure of 28%.

(2) Less than or equal to 0.1 g/g at a relative vapor pressure of 10%, and greater than or equal to 0.25 g/g at a relative vapor pressure of 28%.

(3) Less than or equal to 0.1 g/g at a relative vapor pressure of 20%, and greater than or equal to 0.35 g/g at a relative vapor pressure of 35%.

(4) Less than or equal to 0.1 g/g at a relative vapor pressure of 25%, and greater than or equal to 0.4 g/g at a relative vapor pressure of 40%.

(5) Less than or equal to 0.1 g/g at a relative vapor pressure of 30%, and greater than or equal to 0.48 g/g at a relative vapor pressure of 50%.

(6) Less than or equal to 0.15 g/g at a relative vapor pressure of 40%, and greater than or equal to 0.60 g/g at a relative vapor pressure of 60%.

(7) The difference in the amount of adsorbed water vapor between any two points within a range of relative vapor pressure from greater than or equal to 10% to less than or equal to 28% is greater than or equal to 0.16 g/g, preferably, greater than or equal to 0.18 g/g.

(8) Less than or equal to 0.1 g/g at a relative vapor pressure of 10%, and greater than or equal to 0.2 g/g at a relative vapor pressure of 25%.

(9) The difference in the amount of adsorbed water vapor between any two points within a range of relative vapor pressure from greater than or equal to 10% to less than or equal to 25% is greater than or equal to 0.12 g/g.

(10) Less than or equal to 0.1 g/g at a relative vapor pressure of 8%, and greater than or equal to 0.18 g/g at a relative vapor pressure of 18%.

(11) The difference in the amount of adsorbed water vapor between any two points within a range of relative vapor pressure from greater than or equal to 8% to less than or equal to 18% is greater than or equal to 0.12 g/g.

The water vapor adsorption capacity values can be obtained by measuring a water vapor adsorption isotherm curve. In general, when an adsorbent is adsorbed into pores by capillary action, Kelvin's equation (equation (1)) applies.

$$1n(P/P0) = -(2V_L \gamma \text{ cis } \theta)/rRT \qquad (1)$$

The equation represents a relationship between the pore diameter (r) and the relative vapor pressure (P/P0) when the adsorbent is absorbed by capillary action, wherein $V_L$, $\gamma$ and $\theta$ represent the molecular volume, surface-tension and contact angle of the liquid adsorbent, respectively. Further, R and T represent a gas constant and absolute temperature, respectively.

In order to obtain a water vapor adsorption isotherm, the porous materials may be, for example, immersed into ion-exchanged water for a sufficient period of time (preferably at least for 4 hr, more preferably at least for 8 hr, and further preferably overnight) to make the surface of the porous material become hydrophilic. Thereafter, the porous materials may be filtered and vacuum dried, followed by performing measurements at a temperature of 25° C. As a result of immersion into ion-exchanged water, the porous material surface is hydrated and a stable water vapor adsorption isotherm can be obtained.

In order to determine water vapor adsorption isotherms curves for the porous materials of the present teachings, the water vapor adsorption isotherm curves were measured using a BELSORP 18 (Nippon Bell Co., Ltd.) under following conditions:

Sample temperature: 25° C.

Air thermostat temperature: 50° C.

Standard volume: 180.98 ml

Equilibrium time: 500 seconds

Pre-treatment was performed for each sample before the adsorption measurement. The pre-treatment included the following steps: dispersing 0.5 g of sample into 20 ml of water, subjecting the solution to ultrasonic vibration for 30 min, then standing overnight, removing the water by filtration and air-drying for 24 hrs. When a hot water resistance test was performed, 20 ml of hot water (80° C.) was used. Further, just before the measurement, the samples were subjected to a vacuum of $10^{-2} \sim 10^{-3}$ mmHg at 25° C. for 3 hours or more. These conditions and the above pre-treatment steps were utilized for each of the samples in this specification.

The porous materials preferably may have at least one peak at a diffraction angle corresponding to ad value of greater than or equal to about 1 nm in its X ray diffraction pattern ("XRD"). In this specification, "X ray diffraction peak" means that a periodic structure having ad value corresponding to the peak angle that is present in the sample. The above-described X ray diffraction pattern reflects a structure in which pores are regularly arranged at an interval of at least 1 nm. In other words, mesoporous materials having such a diffraction pattern can be considered as having a uniform pore size based on the regularity of the structure derived from the XRD.

Preferably, 60% or more of the total pore volume is included within a pore diameter range of ±40% from the mean pore diameter, which is determined by a maximum peak in a pore size distribution curve. The pore size distribution curve means a curve drawn, for example, by plotting a value (dv/dD) obtained by differentiating the pore volume (V) by the pore diameter (D) against the pore diameter (D). The pore diameter at the point at which the value dv/dD of the pore size distribution curve is largest (maximum peak) is called the mean pore diameter. The pore size distribution curve can be calculated according to various calculation formula using an adsorption isotherm obtained, for example, from the measurement of nitrogen gas adsorption by the porous material.

A representative measuring method for determining the adsorption isotherm will be described. Nitrogen gas is the most commonly gas used with this method. First, the porous material is cooled with liquid nitrogen to 196° C. and nitrogen gas is introduced. The amount of nitrogen gas adsorbed can be measured, for example, volumetrically or gravimetrically. Nitrogen gas pressure is gradually increased and the amount of adsorbed nitrogen gas is plotted against each equilibrium pressure to create an adsorption isotherm. A pore size distribution curve can then be calculated from this adsorption isotherm using a calculation formula according to the Cranston-Inklay method, Dollimore-Heal method, BJH method or other similar methods.

The phrase "60% or more of the total pore volume is included in the pore diameter range of ±40% of the mean pore diameter in the pore size distribution curve" can be further illustrated by the following example. If the maximum peak in the pore size distribution curve is determined to be 3.00 nm, the mean pore diameter is 3.00 nm. Consequently, the sum of the pore volumes of the pores having a pore diameter between 1.80 to 4.20 nm preferably occupies at least 60% of the total pore volume (i.e., the total volume of pores having a pore volume of not more than 50 nm, which is the upper limit that can be measured using the gas adsorption method). Thus, the integrated value of the pore size distribution curve within the pore diameter range from 1.80 to 4.20 nm preferably occupies at least 60% of the total integrated value of the curve. More preferably, the pore diameters preferably are sufficiently uniform to function as molecular sieves, and exhibit a high selectivity for a reacted material, a product of a catalytic reaction or as an absorbent.

The pores may have the following representative shapes: a one-dimensional tunnel, a three-dimensional bonding box-form or a spherical pore. Representative examples include, but are not limited to, a two-dimensional hexagonal structure (P6 mm), a three-dimensional hexagonal structure (P63/mmc), cubic (Ia3d, Pm3n), lamella, irregular structure and similar structures. The porous materials may be formed, for examples, as powders, granules, supported films, self-support films, transparent films, oriented films, spherical and fiber-like particles, and particles with micron-size clear shape of burning on a substrate and other forms.

Preferably, the porous materials may have skeletons comprising a metal oxide. For example, porous materials may have a silicate skeleton (silica porous materials). The porous materials may have, for example, skeletons of networked metal-oxide bonds that entirely form the porous materials. In addition, the porous materials may have a skeleton containing other metal atoms, such as aluminum, zirconium, tantalum, niobium, tin, hafnium, magnesium, molybdenum, cobalt, nickel, gallium, beryllium, yttrium, lanthanum, lead, vanadium and other metals, in which these representative elements replace some or all of silicon atoms in the silicate skeleton. Moreover, various organic functional groups and/or inorganic functional groups may be attached as side-chain groups bonded to the atoms within the basic skeleton. Preferred groups may include, for example, a thiol group, a carboxyl group, a lower alkyl group such as methyl group, an ethyl group and the other alkyl groups, a phenyl group, an amino group, a vinyl group and other organic groups.

Representative Methods for Forming Porous Materials

As noted above, porous materials can be obtained by condensing a skeleton starting material in the presence of a surfactant in a solution having a concentration of the skeleton starting material that is less than or equal to 0.4 mol/L and a molar ratio of the surfactant to the skeleton starting material within a range from greater than or equal to 0.05 to less than or equal to 50. After condensation, the surfactant is preferably removed from the condensate. If the concentration of the starting material is more than 0.4 mol/L, the pore diameter of the porous material may become large. If the molar ratio is less than 0.05, pores of the porous material may not completely formed. Further, when the molar ratio is more than 50, uniform pore diameters can not be obtained.

For example, the porous materials can be formed by condensing a layered silicate (e.g., kanemite) as a skeleton starting material in a solution of a surfactant (Representative Method (1)). In the alternative, the porous material can be formed by condensing a skeleton starting material, such as sodium silicate, silica, or alkoxysilane or other similar material, in a solution of a surfactant (Representative Method (2)).

Representative Method (1)

A representative method using a layered material, such as the above-mentioned layered silicate or another similar layered material, as the skeleton starting material will be described next. A representative method of making porous materials having a silicate skeleton will be further described below as a representative example.

One or more silicates selected from the group consisting of kanemite ($NaHSi_2O_3 \cdot 3H_2O$), sodium disilicate crystals ($\alpha, \beta, \gamma, \delta-Na_2Si_2O_5$), makatite ($Na_2Si_4O_9 \cdot 5H_2O$), ilerite ($Na_2Si_8O_{17} \cdot XH_2O$), magadiite ($Na_2Si_{14}O_{29} \cdot XH_2O$), kenyaite ($Na_2Si_{20}O_{41} \cdot XH_2O$) or a similar material can be used as a layered silicate that is suitable as a skeleton starting material. In addition, materials obtained by treating clay minerals, such as sepiolite, montmorillonite, vermiculite, mica, kaolinite, and smectite, with an acidic aqueous solution and removing elements other than silica can be also used as other layered silicates. Moreover, one or more silicates selected from the group consisting of water glass, glass, amorphous sodium silicate, silicon alkoxides (tetraethylorthosilicate and the like) or other silicates, other than the above layered silicates, can be also used.

On the other hand, no specific restriction is placed on the surfactants that can be used in this method. Generally, various surfactants, such as anionic, cationic, or nonionic surfactants, can be used. Cationic surfactants may be preferably used, which cationic surfactants may comprise a chloride, bromide, iodide or hydroxide and/or alkyltrimethylammonium ($C_nH_{2n+1}N(CH_3)_3$; n is integer from 2 to 18), alkylammonium, dialkyldimethylammonium, and benzylammonium, as well as anionic surfactants based on fatty acid salts, alkylsulfonates, alkylphosphates, and nonionic surfactants based on polyethylene oxide.

In particular, if the porous materials are desired to have a water vapor adsorption capacity that is less than or equal to 0.1 g/g at a relative vapor pressure of 10%, and greater than or equal to 0.2 g/g at a relative vapor pressure of 28%, an alkyltrimethylammonium is preferred. Also preferred is an octyltrimethylammonium having 8 carbon atoms (n in the above formula) in the alkyl chain. Halides are also preferred, in which the halogen atom may preferably be chlorine or bromine. Further, the surfactants can be used singly or in combinations of two or more.

The above described layered silicate(s) and surfactant(s) may be mixed under acidic or alkaline conditions and the layered silicates may be partially condensed. The surfactant preferably has a concentration that is less than the critical micelle concentration in the solution. While not wishing to be bound by theory, it is believed that in this case only the surfactant that forms ionic bonds with SiO- on the surface of the layered silicate serves as a template. Because excess surfactants are not present in the mixture of starting materials and surfactants, as compared to the case when micelles serve as templates, a regular structure having a small pore size can be obtained.

For example, in the case of octyltrimethylammonium halides, the preferred concentration, while depending on temperature, is generally within a range from 0.05 mol/L to 0.15 mol/L. If the concentration is less than 0.05 mol/L, pores will not be completely formed and if the concentration is more than 0.15 mol/L, uniform pore diameters can not be obtained An even more preferred concentration is 0.075–0.13 mol/L On the other hand, the concentration of the skeleton starting material, such as a layered silicate or a similar material, in the solution is preferably 0.0055 mol/L–0.33 mol/L. If the concentration is less than 0.0055 mol/L uniform pore diameters can not be obtained and if the concentration is more than 0.33 mol/L, pores will not be completely formed.

According to the present teachings, the concentration of skeleton starting materials is preferably calculated based upon the number of moles of metal atoms in the metal oxide skeleton formed from the skeleton starting material. In the case of a skeleton starting material for obtaining a silicate skeleton, the number of moles of silicon serves as a base. For example, in the case of sodium disilicate ($Na_2Si_2O_5$), the metal atom is Si and the concentration is calculated as the number of Si moles. Thus, for 1 mole of sodium disilicate, the calculation is based on 2 moles of silicon. It is even more preferred that the concentration be 0.054–0.2 mol/L In this reaction system, the molar ratio of the surfactant and skeleton starting material (i.e., the ratio of the number of motes of the surfactant to the number of moles of the skeleton-constituting metal atoms in the skeleton starting material) is preferably 0.15–36. If the ratio is less than 0.15, the pores will not be completely formed and if the ratio is more than 36, uniform pore diameters can not be obtained. An even more preferred ratio is 1–20.

Preferably, water is utilized as a solvent. In addition, mixed solvents, in which water is mixed with an organic solvent such as an alcohol miscible with water and the like, can be also used.

The condensation reaction is preferably performed under heating conditions, in which the solution containing the dispersed layered silicate preferably heated at a temperature of 30–100° C. (more preferably, at 60–80° C.). The reaction time is preferably set at 2–24 hrs. Furthermore, the dispersion solution is preferably stirred while the reaction proceeds under heating.

The pH value of the dispersion solution at the initial stage (typically 1–5 hrs) of the condensation reaction is preferably adjusted to be greater than or equal to 10; it may thereafter (typically, after the lapse of greater than or equal to 1 hr) be set to less than or equal to 10. pH control can be performed using an alkali, such as sodium hydroxide, and/or an acid, such as hydrochloric acid. Such pH control makes it possible to obtain porous materials with superior crystallinity and heat resistance. Furthermore, if kanemite is utilized, because kanemite is alkaline when dispersed in water solvent, the pH of the dispersion solution usually will become greater than or equal to 10 without any special treatment.

By conducting such dehydration condensation reaction, it is possible to form structural materials (i.e., a mesoporous materials precursor) having mesopores for which the surfactant serves as the template.

Upon completion of the condensation reaction, the solid product (mesoporous materials precursor) is filtered and recovered from the dispersion. Preferably, the solid product is washed repeatedly with de-ionized water. After the washing, the solid product may be dried. The surfactant that served as a template to form the pores of the precursor can be thereafter removed, preferably by calcining at a temperature of greater than or equal to 550° C. or by immersion ($H_+$ substitution treatment) in a hydrochloric acid/ethanol solution or another surfactant removing solution. For example, when a cationic surfactant is used, the solid product may be, for example, dispersed in ethanol containing a small amount of added hydrochloric acid and stirred under heating at 50–70° C. If an anionic surfactant is used, the surfactant can be extracted in a solution in which an anion has been added. Further, in the case of a nonionic surfactant, extraction can be performed with only a solvent.

When the above-mentioned calcining is performed, it is preferably carried out in an inert gas (e.g., nitrogen) atmosphere to prevent combustion of the surfactant. However, even in this case, in order to prevent the formation a carbon or other residue, it is preferred that an oxidizing atmosphere, such as air or other oxygen containing gas, be employed during the final stage of the calcining procedure.

The above-described treatment process makes it possible to synthesize useful porous materials in which the fine pores are formed from the portions in which the surfactant (template) was removed. In addition, by using the representative methods of making porous materials that employ layered materials, it is also possible to use layered materials having a basic skeleton containing elements other than Si and to manufacture porous materials having such a basic skeleton.

Using representative method (1), porous materials having a small pore size and a uniform pore size distribution can be obtained. The small pore size and the uniform pore size distribution of the obtained porous materials make it possible to obtain porous materials having a water vapor adsorption characteristic in which the amount of adsorbed water vapor is less than or equal to 0.1 g/g at a relative vapor pressure of 10%, and greater than or equal to 0.2 g/g at a relative vapor pressure of 28%. In particular, if octyltrimetylammonium halide is used as a surfactant and layered silicate is used as a skeleton starting material, porous materials can be obtained that have a water vapor adsorption characteristic in which the amount of adsorbed water vapor is less than or equal to 0.1 g/g at a relative vapor pressure of 10%, and greater than or equal to 0.2 g/g at a relative vapor pressure of 28%.

Examples of methods for integrating elements other than Si to the porous skeleton include, for example, using a layered silicate that comprises elements other than Si as the starting material and integrating a substance containing other elements during the synthesis of the mesoporous materials. For this purpose, aluminum nitrate and sodium aluminate can be used.

The porous material obtained by this method may preferably have a mean pore diameter of 1.3 to 1.8 nm, as measured by the Cranston-Inklay method or BJH method.

Representative Method (2)

In another representative method, a skeleton starting material, such as sodium silicate, silica, or an alkoxysilane or similar material, is condensed in a solution of a surfactant. For example, tetraalkoxysilanes such as tetramethoxysilane, tetraethoxysilane, tetrapropoxysilane and alkylalkoxysilanes such as methyltrimethoxysilane and the like may be used as the skeleton starting material(s). Alkylalkoxysilanes and tetraalkoxysilanes having 3 or 4 alkoxy groups having 1 to 4 carbon atoms (preferably 1 to 3 atoms), such as tetraethoxysilane, tetramethoxysilane and the like are preferred. These alkoxysilanes can be used singly or in combinations of two or more. Particularly preferred are tetraalkoxysilanes.

The same surfactants described in Representative Method (1) also can be preferably used as the surfactants in the Representative Method (2), and therefore a description of these surfactants is incorporated by reference and will not be repeated. Especially preferred are octyltrimethylammonium halides and decyltrimethylammonium halides. Such halides preferably comprise chlorine or bromine, or even more preferably, only bromine.

The above-mentioned alkoxysilanes and surfactants may be mixed and condensed under acidic or alkaline conditions. The solvent of the reaction system is preferably water or a mixed solvent comprising water and an organic solvent miscible with water, such as alcohol. Methanol is a preferred organic solvent.

pH control in the reaction system is preferably performed using an alkali, such as sodium hydroxide, and./or an acid, such as hydrochloric acid. Preferably, the above-described cationic surfactant is used and the reaction system is formed under alkaline conditions. In the case of a reaction system using only water, the reaction is preferably performed under alkaline conditions with a pH value greater than or equal to 10, and then the pH value is preferably adjusted to less than 9 (more preferably, less than 8) by neutralization with an acid, such as hydrochloric acid. In the case of a water/alcohol reaction system, after reacting under alkaline conditions with a pH value of greater than or equal to 10, the condensation is advanced by continuing the reaction as is, in particular, without neutralization with an acid. The mixing ratio of the alcohol, such as methanol, in the reaction system of the water/alcohol liquid mixture is preferably less than or equal to 20 wt. % when an octyltrimethylammonium halide is used, and it is 10–40% when decyltrimethylammonium (halide) is used.

In the case of octyltrimethylammonium halides, the concentration of the surfactant is preferably less than the critical micelle concentration. For example, when an octyltrimethylammonium halide is used with water alone as the reaction solvent, the concentration is preferably greater than or equal to 0.05 mol/L and less than or equal to 0.15 mol/L If the concentration is less than 0.05 mol/L, pores will not be formed completely and if the concentration is more than 0.15 mol/L, uniform pore diameters can not be obtained. Even more preferred concentrations are less than or equal to 0.13 mol/L.

When a water/methanol mixed solvent is used, the concentration is preferably greater than or equal to 0.1 mol/L and less than or equal to 0.5 mol/L If the concentration is less than 0.1 mol/L, pores will not be formed completely and if the concentration is more than 0.5 mol/L, uniform pore diameters can not be obtained. Even more preferably, 0.12–0.2 mol/L is used. In addition, when a water/methanol mixed solvent is used, the concentration of a decyltrimethylammonium halide is preferably greater than or equal to 0.01 mol/L and less than or equal to 0.15 mol/L. If the concentration is less than 0.01 mol/L, pores will not be formed completely and if the concentration is more than 0.15 mol/L, uniform pore diameters can not be obtained. Even more preferably, 0.03–0.1 mol/L is used.

While the concentration of the skeleton starting material differs depending of the concentration of the surfactant, the preferred concentration is generally greater than or equal to 0.01 mol/L and less than or equal to 0.2 mol/L. If the concentration is less than 0.01 mol/L, the particles are very small and are very hard to recover and if the concentration is more than 0.2 mol/L, the pore diameter of porous material will become too wide.

In particular, when an octyltrimethylammonium halide is used with water alone as the reaction solvent, the concentration of the skeleton starting material is preferably greater than or equal to 0.01 mol/L and less than or equal to 0.2 mol/L. If the concentration is less than 0.01 mol/L, the particles are very small and are very hard to recover and if the concentration is more than 0.2 mol/L, the pore diameter of porous material will become too wide. Even more preferably, 0.05–0.12 mol/L is used. The molar ratio of the surfactant to the skeleton starting material (calculated as the number of moles of the metal atoms constituting the skeleton) is preferably greater than or equal to 0.07 and less than or equal to 50. Even more preferably, it is 3–20.

When an octyltrimethylammonium halide is used in a water/methanol mixed solvent, the concentration of the skeleton starting material is preferably greater than or equal to 0.02 mol/L and less than or equal to 0.15 mol/L. If the concentration is less than 0.02 mol/L, the particles are very small and are very hard to recover and if the concentration is more than 0.15 mol/L, the pore diameter of porous material will become too large. Even more preferably, 0.05–0.11 mol/L is used. In addition, the surfactant/starting material (typically Si) molar ratio is preferably 0.6–25, and even more preferably, 1.5–10.

When a decyltrimethylammonium halide is used in a water/methanol mixed solvent, the concentration is preferably greater than or equal to 0.01 mol/L and less than or equal to 0.15 mol/L. If the concentration is less than 0.01 mol/L, the particles are very small and are very hard to recover and if the concentration is more than 0.15 mol/L the pore diameter of porous material will become too large. Even more preferably, 0.02–0.11 mol/L is used. The surfactant/starting material (typically Si) molar ratio is preferably 0.07–15, and even more preferably, 0.5–10.

The preferred reaction temperature range is from −50° C. to 100° C. When the reaction system uses only water as the solvent, the temperature is preferably within a range from 60° C. to 80° C. When the reaction system uses a water/methanol mixed solvent, the reaction may be performed, for example, at room temperature.

The reaction time differs appropriately depending on the reaction system. Typically, it is from 1 hr to 48 hrs, but the reaction may also be performed for a longer time. For example, when only water is used as the reaction system solvent, the reaction is preferably performed for greater than or equal to 1 hr at a pH value of greater than or equal to 10, and for greater than or equal to 3 hr at a pH value of less than or equal to 9 (preferably less than or equal to pH 8). It is preferred that stirring is performed within both pH ranges.

Upon completion of the condensation reaction, the formed sediment or solid in a gelled state is filtered, washed, dried and then subjected to a treatment similar to the above-described calcining or $H^+$ replacement treatment, which makes it possible to remove the surfactant and thereby obtain a porous material.

Thus, if the material is subjected to calcining, the solid product is preferably heated to 300–1000° C. (preferably, 400–700° C.). The heating time is preferably greater than or equal to 30 min. In order to completely remove the organic matter, it is especially preferred that the heating is performed for greater than or equal to 1 h. Furthermore, similar to the above-described Representative Method (1), the calcining is preferably performed in an inert gas (nitrogen or the like) atmosphere at a temperature less than about 400° C. in order to prevent combustion.

On the other hand, if $H^+$ replacement treatment with an alcohol or the like is used, the solid product is dispersed and stirred in a solution prepared by adding a small amount of an ionic component of the same electric charge as the surfactant to a solvent having a high surfactant solubility. Thereafter, the solid components are recovered. For example, ethanol, methanol, acetone and the like can be used as the solvent. For example, porous materials consisting of basic skeleton containing elements (for example, metal elements) other than Si can be also manufactured using this method. Typically, this method can be realized by adding a compound containing the above-mentioned sodium silicate, silica, or an alkoxysilane and also other elements as a starting material substance to form the basic skeleton, and conducting the above-described condensation reaction.

Also according to Representative Method (2), porous materials having a small pore size and a uniform pore size distribution can be obtained. The small pore size and the uniform pore size distribution of the obtained porous materials make it possible to obtain a porous materials having water vapor adsorption characteristics in which the amount of adsorbed water vapor is less than or equal to 0.1 g/g at a relative vapor pressure of 10%, and greater than or equal to 0.2 g/g (preferably, greater than or equal to 0.25 g/g) at a relative vapor pressure of 28%.

In particular, if octyltrimetylammonium halide is used as a surfactant, porous materials can be obtained that have a water vapor adsorption characteristic in which the amount of adsorbed water vapor is less than or equal to 0.1 g/g at a relative vapor pressure of 10%, and greater than or equal to 0.2 g/g at a relative vapor pressure of 28%.

If decyltrimethylammonium halide is used as a surfactant, porous materials can be obtained that have a water vapor adsorption characteristic in which the amount of adsorbed water vapor is less than or equal to 0.1 g/g at a relative vapor pressure of 10%, and greater than or equal to 0.25 g/g at a relative vapor pressure of 28%.

Porous materials also can be obtained that have a skeleton in which the difference in the amount of adsorbed water vapor between any two points within a range of relative vapor pressures from greater than or equal to 10% to less than or equal to 28% in the water vapor adsorption isotherm is greater than or equal to 0.16 g/g (preferably, greater than or equal to 0.18 g/g).

Porous materials obtained by this method also may preferably have a mean pore diameter of 1.3 to 1.8 nm, as measured by to the Cranston-Inklay method or BJH method.

Representative Method (3)

Another representative method of making silica porous materials may include mixing a surfactant and a skeleton starting material in the presence of an aqueous solvent with a pH value of greater than or equal to 10, adjusting the pH value of the liquid mixture to obtain a pH value greater than or equal to 9, and removing the surfactant from the solid fraction separated from the liquid mixture after adjusting the pH. This representative method also includes pH control in the condensation reaction system of the surfactant and skeleton starting material of the porous materials, which can be performed similarly to the above-described representative methods (1) and (2). Thus, in the reaction system of the representative methods (1) and (2), the surfactant and skeleton starting material are mixed in the first stage under a condition that the pH is greater than or equal to 10, and then the pH value is decreased, but to greater than or equal to pH 9, by adding an acid in the second stage.

Surfactants described in representative methods (1) and (2) can be utilized. Preferably, alkyltrimethylammonium ($C_nH_{2n+1}N(CH_3)_3$; n is integer from 2 to 18) is used and more preferably, an alkyltrimethylammonium halide having 8 to 18 carbons is used. It is still more preferred that octyltrimethylammonium halides, decyltrimethylammonium halides, dodecyltrimethylammonium halides, tetradecylammonium halides and hexadecylammonium halides (it is preferred that the halogen atom is chlorine or bromine in any halides) are used.

In addition, the solvents of the reaction system of representative methods (1) and (2) can be also used. Preferably, water alone is used as the reaction solvent.

Preferred concentrations of the surfactant are greater than or equal to 0.05 mol/L and less than or equal to 0.5 mol/L. If octyltrimethylammonium halides are used, the preferred concentration is greater than or equal to 0.05 mol/L and less than or equal to 0.3 mol/L If the concentration is less than 0.05 mol/L, pores will not be completely formed and if the concentration is more than 0.3 mol/L, uniform pores can not be obtained. If decyltrimethylammonium halides, dodecyltrimethylammonium halides, tetradecylammonium halides, and hexadecylammonium halides are used, the concentration is preferably greater than or equal to 0.05 mol/L and less than or equal to 0.5 mol/L If the concentration is less than 0.05 mol/L pores will not be completely formed and if the concentration is less than 0.5 mol/L, uniform pores can not be obtained.

The same or similar skeleton starting materials that were described in representative methods (1) and (2) can be also used and therefore, will not be repeated. Thus, layered silicates or various alkoxysilanes and the like can be used. Specific examples include kanemite, sodium silicate, sodium disilicate, tetramethoxysilane, tetraethoxysilane and the like. The skeleton starting materials that were described as preferred in representative methods (1) and (2) also can be used in this representative method.

While the concentration of the skeleton starting material differs depending on the type of surfactant, if an octyltrimethylammonium halide is used, the concentration is preferably greater than or equal to 0.0055 mol/L and less than or equal to 033 mol/L If the concentration is less than 0.0055 mol/L, the particles are very small and are very hard to recover and if the concentration is more than 0.33 mol/L, pore diameter of the porous material will become too large. When decyltrimethylammonium halides, dodecyltrimethylammonium halides, tetradecylammonium halides, and hexadecylammonium halides are used, the concentration of the skeleton starting material is preferably greater than or equal to 0.0055 mol/L and less than or equal to 1 mol/L in all of the cases. If the concentration is less than 0.0055 mol/L, the particles are very small and are very hard to recover and if the concentration is more than 1 mol/L, the pore diameter of porous material will become too large. Further, in the above cases, the molar ratio of the surfactant to the skeleton starting material (calculated as the number of moles of metal atoms constituting the skeleton) is preferably greater than or equal to 0.15 and less than or equal to 36. If the ratio is less than 0.15, pores will not be completely formed and if the ratio is more than 36, uniform pores can not be obtained.

The pH value in the first stage of the reaction is adjusted to be greater than or equal to 10. Except for the case when the reaction system itself provides such a pH condition, the pH value is adjusted by adding an acid such as hydrochloric acid and the like and/or an alkali such as sodium hydroxide and the like. When water alone is used as the reaction solvent, the condition of the pH value being greater than or equal to 10 may be satisfied only by adding the skeleton starting material and surfactant (by the reaction system itself). In this case, the reaction itself may provide a pH value that is greater than or equal to 10 within the concentration ranges of the surfactant and skeleton starting material that are preferred in the above-described representative methods.

The first stage is maintained from 1 h to less than or equal to 20 h, and preferably, for greater than or equal to 3 h. Within this period, the liquid mixture may be allowed to stay in a stationary state, but preferably it is stirred. The temperature can be within a range from room temperature to about 100° C., but preferably is greater than or equal to 50° C., and even more preferably, greater than or equal to 60° C.

As for pH control in the second stage of the reaction, the pH value is reduced within a range of greater than or equal to 9, and preferably greater than or equal to 9.5, by adding an acid. The upper limit of pH in this pH control step is preferably less than pH in the fast stage. Preferably, it is less than or equal to 10.5. Thus, if pH is adjusted to be greater than or equal to 9 in the second stage, the regularity of pores is increased and the water vapor adsorption capacity is increased. The added acid is preferably hydrochloric acid or a similar inorganic acid.

The pH is preferably maintained in the second stage from 1 h to less than or equal to 20 h, and preferably, for greater than or equal to 3 h. Within this period, the liquid mixture may be allowed to stay in a stationary state, but preferably it is stirred. The temperature can be from room temperature to about 100° C., but preferably it is greater than or equal to 50° C. More preferably, it is greater than or equal to 60° C.

By using these methods, a solid fraction is obtained in the liquid mixture. This solid fraction is recovered by filtering, washing and similar methods. Porous materials can be obtained in the same manner as in representative methods (1) and (2) by drying and removing the surfactant. Accordingly, porous materials having a uniform distribution of pore size can be obtained by condensing the surfactant and the skeleton starting material in a state in which the pH is adjusted to be greater than or equal to 9 in the second stage of the reaction system. Therefore, for example, when an octyltrimethylammonium halide is used as a surfactant, porous materials can be obtained that have a water vapor adsorption capacity that is less than or equal to 0.1 g/g at a relative vapor pressure of 10%, and greater than or equal to 0.25 g/g at a relative vapor pressure of 28%.

Also, a porous material can be obtained having a skeleton and in which the difference in the amount of adsorbed water vapor between any two points within a range of relative vapor pressures from greater than or equal to 10% to less than or equal to 28% is greater than or equal to 0.18 g/g (preferably, greater than or equal to 0.23 g/g) in the water vapor adsorption isotherm.

When a decyltrimethylammonium halide is used as a surfactant, porous materials can be obtained that have a water vapor adsorption capacity that is less than or equal to 0.1 g/g at a relative vapor pressure of 20%, and greater than or equal to 0.35 g/g at a relative vapor pressure of 35%.

When a dodecyltrimethylammonium halide is used as a surfactant, porous materials can be obtained that have a water vapor adsorption capacity that is less than or equal to 0.1 g/g at a relative vapor pressure of 25%, and greater than or equal to 0.40 g/g at a relative vapor pressure of 40%. When a tetradecyltrimethylammonium halide is used as a surfactant, porous materials can be obtained that have a water vapor adsorption capacity that is less than or equal to 0.1 g/g at a relative vapor pressure of 30%, and greater than or equal to 0.48 g/g at a relative vapor pressure of 50%. When a hexadecyltrimethylammonium halide is used as a surfactant, porous materials can be obtained that have a water vapor adsorption capacity that is less than or equal to 0.15 g/g at a relative vapor pressure of 40%, and greater than or equal to 0.60 g/g at a relative vapor pressure of 60%.

Representative method (4)

Representative methods are also taught for removing the surfactant from the condensate obtained by condensation of the surfactant and a skeleton starting material, and contacting the obtained calcined materials (porous materials) with a solution of an acid, or a salt of an acid, and a metal ion having a valence of greater than or equal to 3. With this representative method, the resistance of the obtained porous materials to moisture or hot water is increased, which makes it possible to obtain a material having a high water vapor adsorption capacity at a low relative vapor pressure, even in porous materials that have been subjected to hot water treatment (typically about 80° C.). While not wishing to be bound by theory, this increase in resistance to moisture or hot water may be due to the strengthening of the bonds within the skeleton, and more specifically, bonds between the metal element and oxygen (typically, Si—O—Si bonds) by the acid treatment or salt treatment.

Representative method (4) can be applied to above-described representative methods (1) and (2), and more preferably to representative method (2). Therefore, the starting materials described in representative methods (1) and (2) can be used as the skeleton starting materials and are incorporated in this representative method. It is, however, preferred that the skeleton starting materials employed in representative method (2) are used. It is even more preferred that tetraalkoxysilane and alkylalkoxysilane are used as the skeleton starting material. It is still more preferred that an alkylalkoxysilane and tetraalkoxysilane having 3 or 4 alkoxy groups containing from 1 to 4 carbon atoms (preferably 1 to 3) be used, and it is especially preferred that a tetraalkoxysilane having such an alkoxy group is used Typical examples are tetraethoxysilane and tetramethoxysilane.

Further, the surfactants described in representative methods (1) and (2) can be used as the surfactant in this representative method and are therefore incorporated by reference. Preferably, alkyltrimethylammonium compounds are used, and still more preferably, octyltrimethylammonium halides or decyltrimethylammonium halides are used. Halides are preferably compounds comprising chlorine or bromine.

No specific restriction is imposed on the concentration of surfactant in the reaction system. However, if octyltrimethylammonium halides are used, it is preferred that the concentration is less than the critical micelle concentration, because porous materials having uniform pores of small size are readily obtained if the concentration is less than the critical micelle concentration. For example, when an octyltrimethylammonium halide is used with water alone as a reaction solvent, the concentration is preferably greater than or equal to 0.05 mol/L and less than or equal to 0.15 mol/L, and even more preferably, less than or equal to 0.13 mol/L.

When a water/ethanol mixed solvent is used, the concentration is preferably greater than or equal to 0.1 mol/L and less than or equal to 05 mol/L, and even more preferably, 0.12–0.2 mol/L. When a decyltrimethylammonium halide is employed with a water-methanol mixed solvent, the concentration is preferably greater than or equal to 0.01 mol/L and less than 0.15 mol/L and even more preferably, 0.03–0.1 mol/L No specific restriction is imposed on the concentration of the skeleton starting material in the reaction system, but it is preferred that the concentration is less than 0.4 mol/L It is even more preferred that the concentration is greater than or equal to 0.01 mol/L and less than or equal to 0.2 mol/L. Furthermore, the molar ratio of the surfactant to the skeleton starting material (typically Si) is preferably 0.07–25. If the ratio is less than 0.07, pores will not be completely formed and if the ratio is more than 25, uniform pores can not be obtained. In particular, when an octyltrimethylammonium halide is used with water alone as the reaction solvent, the concentration of the skeleton starting material is preferably greater than or equal to 0.01 mol/L and less than or equal to 0.2 mol/L, and even more preferably, 0.05–0.12 mol/L. Further, the molar ratio of the surfactant to the skeleton starting material (calculated as the number of moles of the metal atoms constituting the skeleton) is preferably greater than or equal to 3 and less than or equal to 20. When an octyltrimethylammonium halide is used in a water/methanol mixed solvent, the concentration of the skeleton starting material is preferably greater than or equal to 0.02 mol/L and less than 0.15 mol/L, and even more preferably, 0.05–0.11 mol/L. Further, the surfactant/starting material (typically Si) molar ratio is preferably 0.6–25. If the ratio is less than 0.6, pores will not be completely formed and if the ratio is more than 25, the uniformity of the pores will decrease.

Moreover, when a decyltrimethylammonium halide is used in a water/methanol mixed solvent, the concentration is preferably greater than or equal to 0.01 mol/L and less than or equal to 0.15 mol/L, and even more preferably, 0.02–0.11 mol/L. Furthermore, the surfactant/starting material (typically Si) ratio is preferably 0.07–15. If the ratio is less than 0.07, pores will not be completely formed and if the ratio is more than 15, the uniformity of the pores will decrease.

The above concentrations and the molar ratios are preferably the same as representative method (2).

The pH-and temperature conditions of the reaction system are the same as respective representative methods (1) and (2), and the preferred conditions are preferably used. In particular, when an tetraalkoxysilane or an alkylalkoxysilane is used as the skeleton starting material and an octyltrimethylammonium halide or a decyltrimethylammonium halide is used as the surfactant, the concentration of sodium hydroxide in the reaction system is preferably 10–40 mol % to the skeleton starting material. When the molar ratio is less than 10 mol %, pores are not formed completely. When the ratio is more than 40 mol %, porous material- surfactant composite does not sufficiently precipitate.

Reaction times differ with respect to different reaction systems, but typically 1 to 48 hours are preferred reaction times and the reaction can be continued for more than 48 hours. The surfactant is thereafter removed and preferably is removed by heat treatment (for example, for about 6 h at 550° C.). Upon removal of the surfactant, the porous materials obtained after the removal of the surfactant are added to a solution of an acid, or a salt of an acid, and a metal ion with a valence of greater than or equal to 3, and the porous materials contact the acid or salt. The acid can be brought into contact with the porous materials as such or as a salt with a metal ion with a valence of greater than or equal to 3.

Inorganic acids and/or organic acids may be used. Inorganic acids are preferably one or more acids selected from the group consisting of hydrochloric acid, sulfuric acid, carbonic acid, and nitric acid, but this representative group of acids is not particularly limiting. The organic acids are not limited to, but are preferably one or more acids selected from the group consisting of acetic acid, oxalic acid, phthalic acid and fatty acids. When an acid contacts the porous materials, the inorganic acid is preferably hydrochloric acid or nitric acid, and even more preferably, hydrochloric acid. Similarly, acetic acid is the preferred organic acid. It is further preferred that the acid contacts the porous material as an aqueous solution.

Preferred examples of metal ions having a valence of greater than or equal to three include aluminum ion ($Al^{3+}$), iron (III) ion ($Fe^{3+}$), titanium ion ($Ti^{4+}$), vanadium ion ($V^{3+}$), zirconium ion ($Zr^{4+}$), gallium ion ($Ga^+$) and ruthenium ion ($Ru^{3+}$). Aluminum ion ($Al^{3+}$) or iron (III) ion ($Fe^{3+}$) are particularly preferred, and the iron (III) ion ($Fe^{3+}$) is even more preferred. While any one or more acids from the above-described inorganic acids and organic acids can be used as the acid forming a salt with the metal ion, nitric acid or oxalic acid are preferred. When a salt of an acid and an ion with a valence of greater than or equal to 3 is used, at least one of the metal ions may be provided in the salt. Furthermore, the salt is preferably brought into contact as an aqueous solution. Preferred examples of such salts include aluminum nitrate, iron (III) nitrate, and ammonium titanyl oxalate, vanadium chloride, zirconium nitrate, gallium nitrate and ruthenium chloride. The particularly preferred salts are aluminum nitrate and iron (III) nitrate, and a more preferred salt is iron (III) nitrate.

When such an acid is brought into contact with the porous materials, the normality is preferably set at 0.001–1 N in reaction medium. When it is less than 0.001 N, the quantity of the acid is not sufficient with respect to the skeleton starting material and it can not impart water resistance, and when it is more than 1 N, the acidity is too strong and destroys the pores. More preferably, it is 0.01–0.5 N. When a salt is brought into contact with the porous material, the salt concentration is preferably 0.001 mol/L–5 mol/L in reaction medium. When it is less than 0.001 mol/L, the quantity of acid is not sufficient with respect to the skeleton starting material and it can not impart water resistance, and when it is more than 5 mol/L, the acidity is too strong and destroys the pores. More preferably, it is 0.01–0.5 mol/L. Further, the temperature is preferably 0–100° C. and more preferably 30–70° C.

After contacting with the acid or salt, the solution containing the porous materials is filtered, the porous material is removed from the filter and dried. The porous materials removed from the filter are preferably heat treated at greater than or equal to 100° C. Preferably, the heat treatment is performed at 100–600° C. The heat treatment time is preferably 1–24 hours. Excess acids and salts are removed by this heat treatment.

The porous materials that are subjected to such a contact process, or the contact process and subsequent heat treatment process, have increased moisture resistance and resistance to hot water. For example, when such porous materials are immersed for 24 h in hot water at 80° C. and then its water vapor adsorption isotherm was measured, a significant increase in the adsorbed amount was observed at a specific relative vapor pressure corresponding to the pore size, which is believed to result from the fine pore size and regular arrangement of fine pores. This result was also confirmed by the X ray diffraction pattern after treatment with hot water, wherein the presence of a peak d100 having its origin in the pore spacing was confirmed. Further, the conservation of the porous materials structure after treatment with hot water was confirmed.

The porous material obtained by the present representative method provides a water vapor adsorption capacity that is less than or equal to 0.1 g/g and greater than or equal to 0.2 g/g at a relative vapor pressure of 10% and 25%, respectively, in the water vapor adsorption isotherm. In particular, this water vapor adsorption capacity resulted after the treatment in which the porous material was immersed for 24 h in hot water at 80° C. Further, the porous material has a difference in the amount of adsorbed water vapor between any two points within a range of relative vapor pressures from greater than or equal to 10% to less than or equal to 25% that is greater than or equal to 0.12 g/g. As a result, water vapor adsorbing materials are provided that have superior resistance to moisture and hot water and have a high water vapor adsorption capacity under a low relative vapor pressure. Again, the porous materials obtained by this method may preferably have a mean pore diameter of 1.3 to 1.8 nm, as measured by the Cranston-Inklay method or BJH method.

Representative Method (5)

Representative methods are also taught for condensing a skeleton starting material in a solution which has a concentration of the skeleton starting material that is less than or equal to 0.4 mol/L and has a molar ratio of a surfactant to the skeleton starting material of greater than or equal to 0.07 and less than or equal to 25. After this step, the surfactant is removed from the condensate. Preferably, the skeleton starting material contains Si and Al as metal elements. Using this method, porous materials having good moisture resistance are obtained, which makes it possible to obtain porous materials that are preferred as a material for water vapor adsorption and desorption. The method can be utilized with above-described representative method (2) and the other above-described representative methods using representative method (2). However, it is not utilized with representative method (1), which includes cross-linking between layered silicates.

When this representative method is utilized with representative method (2), an Al-containing skeleton starting material can be used in addition to the Si-containing skeleton starting material described in representative method (2). For example, various aluminate derivatives including alkyl esters of aluminate and aluminate salts such as sodium aluminate and aluminum salts, such as aluminum nitrate can be used. Preferably, the skeleton starting materials employed in representative method (2) are used in this representative method, which skeleton starting materials are hereby incorporated by reference into this method. More preferably, tetraalkoxysilane and alkylalkoxysilanes arc used as the skeleton starting materials, even more preferably, tetraalkoxysilane and alkylalkoxysilanes having 3 or 4 alkoxy groups with 1 to 4 carbon atoms are used, and especially preferably, tetraalkoxysilanes having such alkoxy groups are used. Typical examples are tetraethoxysilane and tetramethoxysilane.

While the concentration of the skeleton starting material differs depending of the concentration of the surfactant, the preferred concentration is greater than or equal to 0.01 mol/L and less than or equal to 0.2 mol/L When it is less than 0.01 mol/L, particles are too small to recover the product efficiently. When it is more than 0.2 mol/L, the pore size of porous material is too large.

The molar ratio of the surfactant to the skeleton starting material (calculated as the number of moles of the metal atoms constituting the skeleton, Si and Al) is preferably greater than or equal to 0.07 and less than or equal to 25. When it is less than 0.07, pores are not completely formed, and when it is more than 25, uniform pores can not be obtained. More preferably, 0.1–10 is used. Further, preferred molar ratios of the Al molar amount to the total molar amount of Si and Al in the skeleton starting material are 0.0005–0.2. When it is less than 0.0005, the water resistance of the porous material is reduce and when it is more than 0.2, uniform pores can not be obtained. More preferably, it is 0.001–0.2, even more preferably 0.001–0.1, and further more preferably 0.02–0.06.

Surfactants used in representative method (2) can be also used in this representative method and are hereby incorporated by reference. Preferably, alkyltrimethylammonium compounds be used, and it is even more preferred that octyltrimethylammonium halides or decyltrimethylammonium halides are used. The halide is preferably a compound containing chlorine or bromine.

No specific restriction is imposed on the concentration of surfactant in the reaction system. However, in the case of octyltrimethylammonium halides, the preferred concentration is less than the critical micelle concentration, because porous materials having uniform pores of a small diameter can be readily obtained if the concentration is less than the critical micelle concentration.

If octyltrimethylammoniun halides, for example, are used with water alone as the reaction solvent, the concentration is preferably greater than or equal to 0.05 mol/L and less than or equal to 0.15 mol/L, and even more preferably, less than or equal to 0.13 mol/L. In this case, the skeleton starting material is preferably 0.01 mol/L–0.2 mol/L (more preferably 0.05 mol/L–0.12 mol/L). When a water/methanol mixed solvent is used, the concentration is preferably greater than or equal to 0.1 mol/L and less than or equal to 0.5 mol/L, and even more preferably, 0.12–0.2 mol/L . In this case, the skeleton starting material is preferably 0.02 mol/L–0.15 mol/L (more preferably 0.05 mol/L–0.11 mol/L).

When a water/methanol mixed solvent is used, the concentration of a decyltrimethylammonium halide is preferably greater than or equal to 0.01 mol/L and less than or equal to 0.15 mol/L. Even more preferably, it is 0.03–0.1 mol/L. In this case, the skeleton starting material concentration is preferably 0.01 mol/L–0.15 mol/L (more preferably 0.02 mol/L–0.11 mol/L).

The same pH and temperature conditions of the reaction system can be used that are suitable for respective representative methods (2), and the preferred conditions are preferably used. In particular, when an tetraalkoxysilane or an alkylalkoxysilane is used as the skeleton starting material and an octyltrimethylammonium halide or a decyltrimethylammonium halide is used as the surfactant, the concentration of sodium hydroxide in the reaction system is preferably 10–40 mol % with respect to the skeleton starting material. When the molar ratio is less than 10 mol %, pores are not completely formed. When the ratio is more than 40 mol %, the porous material/surfactant composite is not precipitated sufficiently.

Reaction time is different with respect to reaction systems, but typically is 1 to 48 hours. The reaction can be continued more than 48 hours. The surfactant is thereafter removed, preferably by heat treatment (for example for about 6 h at 550° C.). As a result, porous materials containing Si and Al in the skeleton are obtained. That is, the porous material preferably has a metal oxide skeleton consisting of a network of Si—O— bonds and —Al—O— bonds.

After the immersion of the obtained porous materials for 24 h in hot water at 80° C., a peak d100 having its origin in the pore spacing is observed in the X ray diffraction pattern. Further, the fine pore structure is maintained even after the treatment with hot water and no collapse of the fine pore structure caused by a hot-water test is observed. When such porous materials were immersed overnight in water or water of 80° C. and thereafter its water vapor adsorption isotherm was measured, the results indicated that the porous materials had a water vapor adsorption capacity with an amount of adsorbed water vapor that is less than or equal to 0.1 g/g and greater than or equal to 0.18 g/g at a relative vapor pressure of 8% and 18%, respectively. In particular, if Si and Al are included in the skeleton and the Al/(Si+Al) molar ratio in the skeleton starting material (Al/(Si+Al) molar ratio in the skeleton) is less than 0.12 (preferably less than or equal to 0.1, more preferably less than or equal to 0.08), then such porous materials can be easily obtained. Further, if the ratio is 0.02–0.06, then porous materials are obtained that have a water vapor adsorption capacity with an amount of adsorbed water vapor that is less than or equal to 0.1 g/g and greater than or equal to 0.20 g/g at a relative vapor pressure of 8% and 18%, respectively. Furthermore, porous materials are obtained in which the difference in the amount of adsorbed water vapor between any two points within a range of relative vapor pressure from greater than or equal to 8% to less than or equal to 18% is greater than or equal to 0.12 g/g.

Thus, with the present representative method porous materials are obtained that have a high water vapor adsorption capacity under a low relative vapor pressure and good resistance to hot water (including moisture resistance). This porous material is suitable as a water vapor adsorbing-desorbing material.

The porous material obtained by this method may preferably have a mean pore diameter of 1.0 to 1.5 nm, as measured by the Cranston-Inklay method or BJH method.

Further representative examples of the present teachings will now be described in further detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and aspects disclosed in the following detail description may not be necessary to practice the invention in the broadest sense, and are instead taught merely to particularly describe some representative examples of the invention. Moreover, various features of the representative examples may be combined in ways that are not specifically enumerated in order to provide additional useful embodiments of the present teachings.

REPRESENTATIVE EXAMPLES

Examples Based Upon Representative Method (1)

Example 1

To 1 L (liter) of water, 25 g of octyltrimethylammonium bromide and 5 g of sodium disilicate were added. After being heated to 70° C., the mixture was stirred for 3 hours. Then, the mixture was neutralized with about 25 ml of 2N hydrochloric acid and again stirred for 3 hours. Filtration and washing of the neutralized mixture were repeated 5 times to obtain a white powder. The white powder was dried for 3 days by a hot air dryer and then baked at 550° C. to remove organic components. A portion of the baked powder was dispersed in water and after that, the resultant water was left still overnight. Filtration of the resultant water was carried out under reduced pressure and then the obtained product was naturally dried and a water vapor adsorption isotherm curve of the product was measured at 25° C. Since the present silica porous material had uniform and fine pores, the adsorption capacity was remarkably increased at a specified relative vapor pressure corresponding to the diameter of the fine pores. The amount of adsorbed water vapor was 0.06 g/g at 10% relative vapor pressure and the amount of adsorbed water vapor was 0.25 g/g at 28% relative vapor pressure.

Example 2

To 1 L of water, 37 g of octyltrimethylammonium bromide and 25 g of sodium disilicate were added. After being heated to 70° C., the mixture was stirred for 3 hours. Then, the mixture was neutralized with about 125 ml of 2N hydrochloric acid and again stirred for 3 hours. Filtration and washing of the neutralized mixture were repeated 5 times to obtain a white powder. The white powder was dried for 3 days by a hot air dryer and then baked at 550° C. to remove organic components. A portion of the baked powder was dispersed in water and after that, the resultant water was left still overnight. Filtration of the resultant water was carried out under reduced pressure and then the obtained product was naturally dried and a water vapor adsorption isotherm curve of the product was measured at 25° C. The amount of adsorbed water vapor was 0.06 g/g at 10% relative vapor pressure and the amount of adsorbed water vapor was 0.22 g/g at 28% relative vapor pressure.

Example 3

To 1 L of water, 15.1 g of octyltrimethylammonium bromide and 10 g of sodium disilicate were added. After being heated to 70° C., the mixture was stirred for 3 hours. Then, the mixture was neutralized with about 50 ml of 2N hydrochloric acid and again stirred for 3 hours. Filtration and washing of the neutralized mixture were repeated 5 times to obtain a white powder. The white powder was dried for 3 days by a hot air dryer and then baked at 550° C. to remove organic components. A portion of the baked powder was dispersed in water and after that, the resultant water was left still overnight. Filtration of the resultant water was carried out under reduced pressure and then the obtained product was naturally dried and a water vapor adsorption isotherm curve of the product was measured at 25° C. The amount of adsorbed water vapor was 0.06 g/g at 10% relative vapor pressure and the amount of adsorbed water vapor was 0.24 g/g at 28% relative vapor pressure.

Comparative Example 1

To 1 L of water, 25 g of octyltrimethylammonium bromide and 50 g of sodium disilicate were added. After being heated to 70° C., the mixture was stirred for 3 hours. Then, the mixture was neutralized with about 250 ml of 2N hydrochloric acid and again stirred for 3 hours. Filtration and washing of the neutralized mixture were repeated 5 times to obtain a white powder. The white powder was dried for 3 days by a hot air dryer and then baked at 550° C. to remove organic components. A portion of the baked powder was dispersed in water and after that, the resultant water was left still overnight. Filtration of the resultant water was carried out under reduced pressure and then the obtained product was naturally dried and a water vapor adsorption isotherm curve of the product was measured at 25° C. The amount of adsorbed water vapor was 0.06 g/g at 10% relative vapor pressure and the amount of adsorbed water vapor was 0.12 g/g at 28% relative vapor pressure.

Comparative Example 2

To 1 L of water, 126 g of octyltrimethylammonium bromide and 10 g of sodium disilicate were added. After being heated to 70° C., the mixture was stirred for 3 hours. Then, the mixture was neutralized with about 50 ml of 2N hydrochloric acid and again stirred for 3 hours. Filtration and washing of the neutralized mixture were repeated 5 times to obtain a white powder. The white powder was dried for 3 days by a hot air dryer and then baked at 550° C. to remove organic components. A portion of the baked powder was dispersed in water and after that, the resultant water was left still overnight. Filtration of the resultant water was carried out under reduced pressure and then the obtained product was naturally dried and a water vapor adsorption isotherm curve of the product was measured at 25° C. The amount of adsorbed water vapor was 0.08 g/g at 10% relative vapor pressure and the amount of adsorbed water vapor was 0.15 g/g at 28% relative vapor pressure.

Comparative Example 3

To 100 ml of water, 5 g of δ type sodium disilicate were added, dispersed and stirred for 30 minutes to obtain kanemite. After filtration of the mixture, the resulting kanemite was dispersed into 70 ml of an octyltrimethylammonium bromide solution at concentration of 0.14 mol/L, and the solution was stirred for 3 hours at 70° C. The solution was neutralized with 2N hydrochloric acid and adjusted pH to 8.5. Then, the solution was stirred for 3 hours, filtered and the white powder was isolated. The white powder was dried for 3 days by a hot air dryer and then baked at 550° C. to remove organic components. A portion of the baked powder was dispersed in water and after that, the resultant water was left still overnight. Filtration of the resultant water was carried out under reduced pressure and then the obtained product was naturally dried and a water vapor adsorption isotherm curve of the product was measured at 25° C. The amount of adsorbed water vapor was 0.06 g/g at 10% relative vapor pressure, 0.16 g/g at 28% relative vapor pressure and the amount of adsorbed water vapor was 0.21 g/g at 32% relative vapor pressure.

Examples Based Upon Representative Method (2)

Example 4

To 950 ml of water, 100 g of octyltrimethylammonium bromide, 15.2 g of tetramethoxysilane and 50 ml of 1 mol/L sodium hydroxide solution were added. After being heated to 70° C., the mixture was stirred for 1 hour. Then, the mixture was neutralized with about 50 ml of 2N hydrochloric acid and again stirred for 3 hours. Filtration and washing of the neutralized mixture were repeated 5 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was formed at 25° C. The amount of adsorbed water vapor was 0.05 g/g at 10% relative vapor pressure and the amount of adsorbed water vapor was 0.24 g/g at 28% relative vapor pressure.

Example 5

To 975 ml of water, 25 g of octyltrimethylammonium bromide, 7.6 g of tetramethoxysilane and 25 ml of 1 mol/L sodium hydroxide solution were added. After being heated to 70° C., the mixture was stirred for 1 hour. Then, the mixture was neutralized with about 25 ml of 2N hydrochloric acid and again stirred for 3 hours. Filtration and washing of the neutralized mixture were repeated 5 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The vapor adsorption capacity was 0.05 g/g at 10% relative vapor pressure and the vapor adsorption capacity was 0.22 g/g at 28% relative vapor pressure.

Example 6

To 900 ml of water, 17.6 g of octyltrimethylammonium bromide, 30.4 g of tetramethoxysilane and 100 ml of 1mol/L sodium hydroxide solution were added. After being heated to 70° C., the mixture was stirred for 1 hour. Then, the mixture was neutralized with about 100 ml of 2N hydrochloric acid and again stirred for 3 hours. Filtration and washing of the neutralized mixture were repeated 5 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amount of adsorbed water vapor was 0.05 g/g at 10% relative vapor pressure and the vapor adsorption capacity was 0.21 g/g at 28% relative vapor pressure.

Comparative Example 4

To 750 ml of water, 25 g of octyltrimethylammonium bromide, 76 g of tetramethoxysilane and 250 ml of 1 mol/L sodium hydroxide solution were added. After being heated to 70° C., the mixture was stirred for 1 hour. Then, the mixture was neutralized with about 250 ml of 2N hydrochloric acid and again stirred for 3 hours. The same steps were performed to obtain a porous material under the same conditions as the above Example 4 and a water vapor adsorption isotherm curve was measured at 25° C. The amount of adsorbed water vapor was 0.06 g/g at 10% relative vapor pressure and the amount of adsorbed water vapor was 0.11 g/g at 28% relative vapor pressure.

Comparative Example 5

To 950 ml of water, 151 g of octyltrimethylammonium bromide, 15 g of tetramethoxysilane and 50 ml of 1 mol/L sodium hydroxide solution were added. After being heated to 70° C., the mixture was stirred for 1 hour. Then, the mixture was neutralized with about 50 ml of 2N hydrochloric acid and again stirred for 3 hours. Filtration and washing of the neutralized mixture were repeated 5 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10% and 28% relative vapor pressure were 0.07 g/g and 0.14 g/g, respectively.

Example 8

To 750 ml of water and 250 ml of methanol, 15.4 g of decyltrimethylammonium bromide and 22.8 ml of 1N sodium hydroxide were added. Upon being added to the resultant solution, 13.2 g of tetramethoxysilane was completely dissolved and then a white powder was precipitated. After being stirred for 8 hours at a room temperature, the resultant mixture was kept still overnight. Filtration and washing of the mixture were repeated 3 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10% and 28% relative vapor pressure were 0.05 g/g and 0.32 g/g, respectively.

Example 9

To 600 ml of water and 400 ml of methanol, 46.2 g of decyltrimethylammonium bromide and 5.6 ml of 1N sodium hydroxide were added. Upon being added to the resultant solution, 3.3 g of tetramethoxysilane was completely dissolved and then a white powder was precipitated. After being stirred for 8 hours at a room temperature, the resultant mixture was kept still overnight. Filtration and washing of the mixture were repeated 3 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10% and 28% relative vapor pressure were 0.05 g/g and 0.28 g/g, respectively.

Example 10

To 900 ml of water and 100 ml of methanol, 8.4 g of decyltrimethylammonium bromide and 39.4 ml of 1N sodium hydroxide were added. Upon being added to the resultant solution, 22.8 g of tetramethoxysilane was completely dissolved and then a white powder was precipitated. After being stirred for 8 hours at a room temperature, the resultant mixture was kept still overnight. Filtration and washing of the mixture were repeated 3 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10% and 28% relative vapor pressure were 0.05 g/g and 0.25 g/g, respectively.

Comparative Example 6

To 750 ml of water and 250 ml of methanol, 8.4 g of decyltrimethylammonium bromide and 52.5 ml of 1N sodium hydroxide were added. Upon being added to the resultant solution, 30.4 g of tetramethoxysilane was completely dissolved and then a white powder was precipitated. After being stirred for 8 hours at a room temperature, the resultant mixture was kept still overnight. Filtration and washing of the mixture were repeated 3 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10% and 28% relative vapor pressure were 0.06 g/g and 0.17 g/g, respectively.

Comparative Example 7

To 900 ml of water and 100 ml of methanol, 84 g of decyltrimethylammonium bromide and 39.4 ml of 1N sodium hydroxide were added. Upon being added to the resultant solution, 22.8 g of tetramethoxysilane was completely dissolved and then a white powder was precipitated. After being stirred for 8 hours at a room temperature, the resultant mixture was kept still overnight. Filtration and washing of the mixture were repeated 3 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10% and 28% relative vapor pressure were 0.08 g/g and 0.13 g/g, respectively.

Example 11

To 960 ml of water and 40 ml of methanol, 37.8 g of octyltrimethylammonium bromide and 22.8 ml of 1N sodium hydroxide were added. Upon being added to the resultant solution, 13.2 g of tetramethoxysilane was completely dissolved and then a white powder was precipitated. After being stirred for 8 hours at a room temperature, the resultant mixture was kept still overnight Filtration and washing of the mixture were repeated 3 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10% and 28% relative vapor pressure were 0.05 g/g and 0.21 g/g, respectively.

Example 12

To 800 ml of water and 200 ml of methanol, 126.1 g of octyltrimethylammonium bromide and 7.94 ml of 1N sodium hydroxide were added. Upon being added to the resultant solution, 4.6 g of tetramethoxysilane was completely dissolved and then a white powder was precipitated. After being stirred for 8 hours at a room temperature, the resultant mixture was kept still overnight Filtration and washing of the mixture were repeated 3 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10% and 28% relative vapor pressure were 0.05 g/g and 0.21 g/g, respectively.

Example 13

To 900 ml of water and 100 ml of methanol, 30.3 g of octyltrimethylammonium bromide and 36.8 ml of 1N sodium hydroxide were added. Upon being added to the resultant solution, 21.3 g of tetramethoxysilane was completely dissolved and then a white powder was precipitated. After being stirred for 8 hours at a room temperature, the resultant mixture was kept still overnight. Filtration and washing of the mixture were repeated 3 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10% and 28% relative vapor pressure were 0.05 g/g and 0.23 g/g, respectively.

Comparative Example 8

To 900 ml of water and 100 ml of methanol, 37.8 g of octyltrimethylammonium bromide and 78.9 ml of 1N sodium hydroxide were added. Upon being added to the resultant solution, 45.7 g of tetramethoxysilane was completely dissolved and then a white powder was precipitated. After being stirred for 8 hours at a room temperature, the resultant mixture was kept still overnight. Filtration and washing of the mixture were repeated 3 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10% and 28% relative vapor pressure were 0.08 g/g and 0.16 g/g, respectively.

Comparative Example 9

To 800 ml of water and 200 ml of methanol, 201 g of octyltrimethylammonium bromide and 78.9 ml of 1N sodium hydroxide were added. Upon being added to the resultant solution, 45.7 g of tetramethoxysilane was completely dissolved and then a white powder was precipitated. After being stirred for 8 hours at a room temperature, the resultant mixture was kept still overnight. Filtration and washing of the mixture were repeated 3 times to obtain a white powder. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10% and 28% relative vapor pressure were 0.08 g/g and 0.13 g/g, respectively.

Comparative Example 10

29 wt % decyltrimethylammonium bromide water solution was passed through a ion-exchange resin and a decyltrimethylammonium hydroxide solution was obtained. To 50.75 g of the decyltrimethylammonium hydroxide solution, 8.75 g of tetramethoxysilane was added and stirred for 1 hour. After transferring to a polypropyren container, the mixture was heated for 24 hours in a steam box. The resulting precipitate was filtered and washed with warm water and acetone. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10%, 28% and 32% relative vapor pressure were 0.06 g/g, 0.12 g/g and 028 g/g, respectively.

Comparative Example 11

To 30 ml of water, 18.7 g of sodium silicate powder was dissolved and a solution, which was prepared by adding 1.2 g of concentrated sulfuric acid to 10 g of water, was added to the mixture. After being stirred for 10 minutes, 11.6 g of octyltrimethylammonium bromide was added after being dissolved in a 29 wt % octyltrimethylammonium bromide solution. After being stirred for 30 minutes, the mixture was transferred to an auto-clave and heated for 2 days at 140° C. The precipitate was filtered and washed with water. The white powder was dried for 3 days by a hot air dryer and then baked at 550° C. to remove organic components. A portion of the baked powder was dispersed in water and then the resultant water was left still overnight. Filtration of the resultant water was carried out under reduced pressure and then the obtained product was naturally dried and a water vapor adsorption isotherm curve of the product was measured at 25° C. The amounts of adsorbed water vapor at 10%, 28% and 32% relative vapor pressure were 0.07 g/g, 0.15 g/g and 022 g/g, respectively.

Examples Based Upon Representative Method (3)

Example 15

To 1 L of water, 25 g of octyltrimethylammonium bromide and 10 g of sodium disilicate were added. After being heated to 70° C., the mixture was stirred for 3 hours. Then, after the pH of the mixture was decreased to pH 10.2 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 10% and 28% relative vapor pressure were 0.05 g/g and 0.32 g/g, respectively.

Example 16

To 1 L of water, 25 g of octyltrimethylammonium bromide and 10 g of sodium disilicate were added. After being heated to 70° C., the mixture was stirred for 3 hours. Then, after the pH of the mixture was decreased to pH 9 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 10% and 28% relative vapor pressure were 0.05 g/g and 0.28 g/g, respectively.

Comparative Example 12

To 1 L of water, 25 g of octyltrimethylammonium bromide and 10 g of sodium disilicate were added. After being heated to 70° C., the mixture was stirred for 3 hours. Then, after the pH of the mixture was decreased to pH 8 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 10% and 28% relative vapor pressure were 0.06 g/g and 0.23 g/g, respectively.

Example 17

To 1 L of water, 28.2 g of decyltrimethylammonium bromide and 50 g of sodium disilicate were added. After being heated to 70° C., the mixture was stirred for 3 hours. Then, after the pH of the mixture was decreased to pH 10 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 20% and 35% relative vapor pressure were 0.08 g/g and 0.41 g/g, respectively.

Example 18

To 750 ml of water, 28.2 g of decyltrimethylammonium bromide 76.1 g of tetramethoxysilane and 250 ml of 1 mol/L sodium hydroxide solution were added. After being heated to 70° C., the mixture was stirred for 3 hours. Then, after the pH of the mixture was decreased to pH 9 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 20% and 35% relative vapor pressure were 0.08 g/g and 0.38 g/g, respectively.

Comparative Example 13

To 1 L of water, 28.2 g of decyltrimethylammonium bromide and 50 g of sodium disilicate were added. After being heated to 70° C., the mixture was stirred for 3 hours. Then, after the pH of the mixture was decreased to pH 7.5 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 20% and 35% relative vapor pressure were 0.11 g/g and 0.33 g/g, respectively.

Example 19

To 1 L of water, 30.8 g of dodecyltrimethylammonium bromide and 50 g of sodium disilicate were added. After being heated to 70° C., the mixture was stirred for 3 hours. Then, after the pH of the mixture was decreased to pH 10.1 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 25% and 40% relative vapor pressure were 0.09 g/g and 0.45 g/g, respectively.

Example 20

To 750 ml of water, 30.8 g of dodecyltrimethylammonium bromide, 76.1 g of tetramethoxysilane and 250 ml of 1 mol/L sodium hydroxide solution were added. After being heated to 70° C., the mixture was stirred for 3 hours. Then, after the pH of the mixture was decreased to pH 9.5 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 25% and 40% relative vapor pressure were 0.08 g/g and 0.41 g/g, respectively.

Comparative Example 14

To 1 L of water, 30.8 g of dodecyltrimethylammonium bromide and 50 g of sodium disilicate were added. After being heated to 70° C., the mixture was stirred for 3 hours. Then, after the pH of the mixture was decreased to pH 75 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 25% and 40% relative vapor pressure were 0.10 g/g and 0.38 g/g, respectively.

Example 21

To 1 L of water, 33.6 g of tetradecyltrimethylammonium bromide and 50 g of sodium disilicate were added. After being heated to 70° C., the mixture was stirred for 3 hours. Then, after the pH of the mixture was decreased to pH 9.5 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 30% and 50% relative vapor pressure were 0.09 g/g and 0.50 g/g, respectively.

Example 22

To 750 ml of water, 33.6 g of tetradecyltrimethylammonium bromide, 76.1 g of tetramethoxysilane and 250 ml of 1 mol/L sodium hydroxide solution were added. After being heated to 70° C., the mixture was stirred for 3 hours. Then, after the pH of the mixture was decreased to pH 9.0 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 30% and 50% relative vapor pressure were 0.09 g/g and 0.50 g/g, respectively.

Comparative Example 15

To 1 L of water, 33.6 g of tetradecyltrimethylammonium bromide and 50 g of sodium disilicate were added. After being heated to 70° C., the mixture was stirred for 3 hours. Then, after the pH of the mixture was decreased to pH 7.5 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 30% and 50% relative vapor pressure were 0.05 g/g and 0.45 g/g, respectively.

Example 23

To 1 L of water, 36.4 g of hexadecyltrimethylammonium bromide and 50 g of sodium disilicate were added. After being heated to 70° C., the mixture was stirred for 3 hours. Then, after the pH of the mixture was decreased to pH 9.5 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 40% and 60% relative vapor pressure were 0.12 g/g and 0.65 g/g, respectively.

Example 24

To 750 ml of water, 36.4 g of hexadecyltrimethylammonium bromide, 76.1 g of tetramethoxysilane and 250 ml of 1 mol/L sodium hydroxide solution were added. After being heated to 70° C., the mixture was stirred for 3 hours. Then, after the pH of the mixture was decreased to pH 9.0 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 40% and 60% relative vapor pressure were 0.14 g/g and 0.64 g/g, respectively.

Comparative Example 16

To 1 L of water, 36.4 g of hexadecyltrimethylammonium bromide and 50 g of sodium disilicate were added. After being heated to 70° C., the mixture was stirred for 3 hours. Then, after the pH of the mixture was decreased to pH 7.5 by titrating with a 2N hydrochloric acid, the mixture was again stirred for 3 hours. Filtration and washing of the resultant mixture were repeated 5 times to recover a white powder. The white powder was dried for 3 days by a hot air dryer and then baked at 550° C. to remove organic components. A water vapor adsorption isotherm curve of the product was measured at 25° C. to find that the amounts of adsorbed water vapor of the product at 40% and 60% relative vapor pressure were 0.16 g/g and 0.54 g/g, respectively.

Examples Based Upon Representative Method (4)

Example 25

After 1.54 g of decyltrimethylammonium bromide, 2.28 g of 1N sodium hydroxide, 72.7 g of water, and 25 g of methanol were mixed, 1.32 g of tetramethoxysilane (TMOS) was added to precipitate a porous material-surfactant composite. After being stirred for 8 hours at a room temperature, the resultant mixture was left overnight and then filtered under a reduced pressure and re-dispersed in water two times. After again being filtered under a reduced pressure, the obtained product was dried out at 45° C. for 3 days. The powder was heated at 550° C. for 6 hours to remove the surfactant in the pores. Then, 0.5 g of the powder was immersed in 20 g of an aqueous solution of 0.01N hydrochloric acid at 50° C. for 20 hours. After being filtered, the obtained powder was again heated at 550° C. for 6 hours.

After the powder was immersed in hot water at 80° C. for 24 hours (hot water resistance test), the vapor adsorption isotherm curve was measured. The amounts of adsorbed water vapor at P/P0=0.10 and P/P0=0.25 were 0.07 g/g and 0.26 g/g, respectively.

Figure 2:
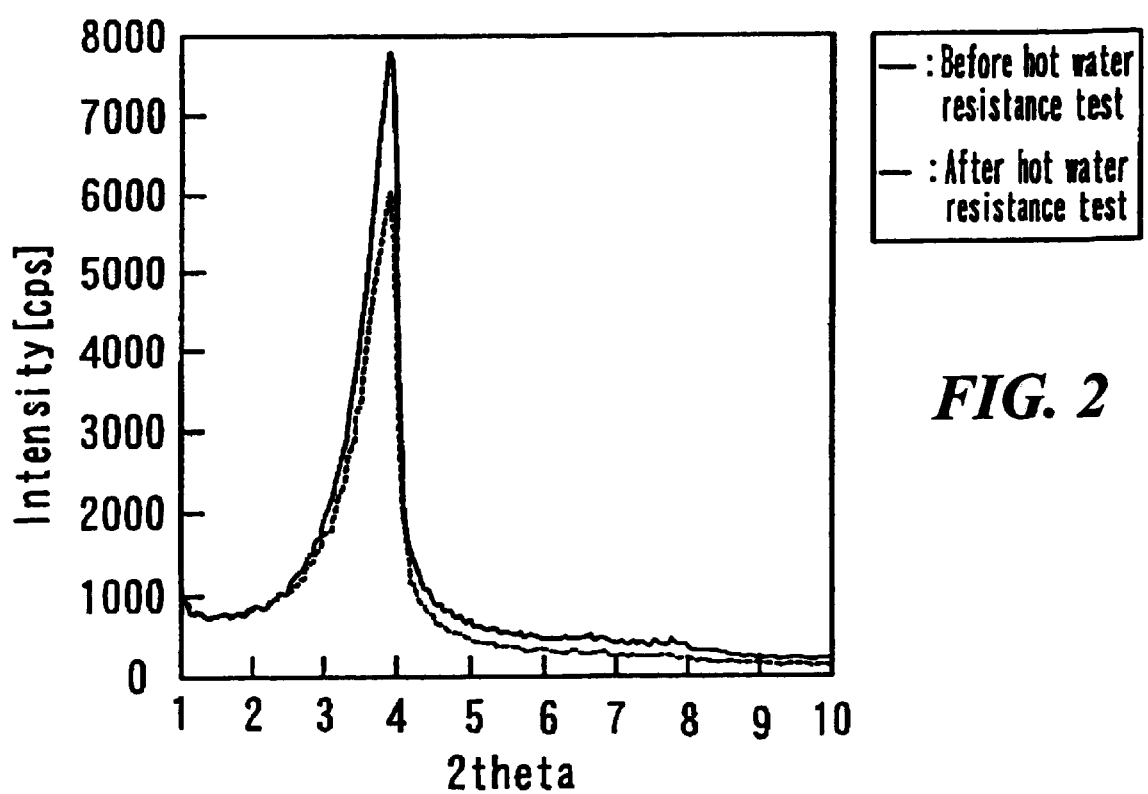
FIG. 2 shows XRD patterns of before and after a hot water resistance test of the porous material synthesized in Example 25.

The vapor adsorption isotherm curve is illustrated in FIG. 1 and it is understood that since the present porous material had uniform and fine pores, the adsorption capacity was remarkably increased at a specified relative vapor pressure corresponding to the diameter of the fine pores. X-ray diffraction patterns before and after the hot water resistance test are illustrated in FIG. 2 and it is understood that there is peak d 100 attributed to the gaps between neighboring fine pores and that the porous material maintains the porous skeleton structure with uniform pore diameter even after the hot water resistance test.

Comparative Example 17

After 1.54 g of decyltrimethylammonium bromide, 2.28 g of 1N sodium hydroxide, 72.7 g of water, and 25 g of methanol were mixed, 1.32 g of tetramethoxysilane was added to precipitate a porous material-surfactant composite. After being stirred for 8 hours at a room temperature, the resultant mixture was left overnight and then filtration under a reduced pressure and re-dispersion in water were repeated two times. After again being filtered under a reduced pressure, the obtained product was dried at 45° C. for 3 days. The surfactant in the fine pores of the powder was removed by heating at 550° C. for 6 hours.

After the powder was immersed in hot water at 80° C. for 24 hours, the vapor adsorption isotherm curve was measured. As illustrated in FIG. 1, the water vapor adsorptions at $P/P0=0.10$ and $P/P0=0.25$ were 0.06 g/g and 0.13 g/g, respectively.

Figure 3:
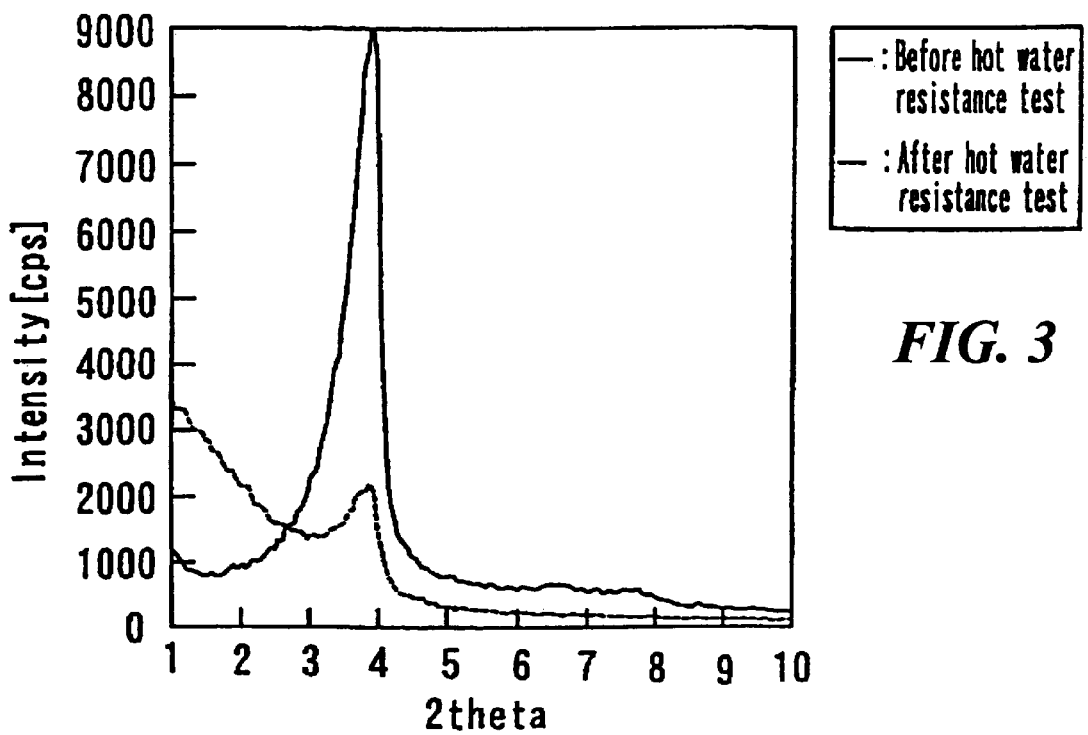
FIG. 3 shows XRD patterns of before and after a hot water resistance test of the porous material synthesized in Comparative Example 17.

X-ray diffraction patterns before and after the test are illustrated in FIG. 3. Even though a slight peak d 100 exists that is attributed to the gaps between neighboring fine pores, the lower angle side rises to suggest formation of silica gel, which indicates destruction of fine pores by the hot water resistance test and formation of uneven pore components.

Comparative Example 18

In accordance with Bull. Chem. Soc. Japan., 69, 1449 (1996), after 2.5 g of octyltrimethylammonium bromide was dissolved in 100 g of water, 5 g of sodium disilicate was added. After the mixture was stirred at 70° C. for 3 hours, the mixture was neutralized to pH 8.5 with 2N hydrochloric acid. The mixture was further stirred for 3 hours and left still overnight and then filtration under reduced pressure and re-dispersion in water were repeated 2 times. Again, filtration under reduced pressure was carried out, the product was dried at 45° C. for 3 days to obtain a porous composite containing a surfactant. The surfactant in the fine pores of the obtained powder was removed by heating the powder at 550° C. for 6 hours.

After the powder was immersed in hot water at 80° C. for 24 hours, the water vapor adsorption isotherm curve was measured. The amounts of adsorbed water vapor at $P/P0=0.10$ and $P/P0=0.25$ were 0.08 g/g and 0.12 g/g, respectively.

Example 26

After 1.54 g of decyltrimethylammonium bromide, 2.28 g of 1N sodium hydroxide, 72.7 g of water, and 25 g of methanol were mixed, 1.32 g of tetramethoxysilane (TMOS) was added to precipitate a porous material-surfactant composite. After being stirred for 8 hours at room temperature, the resultant mixture was left still overnight and then filtration under a reduced pressure and re-dispersion in water were repeated two times. After again being filtered under a reduced pressure, the obtained product was dried out at 45° C. for 3 days. The resultant powder was heated at 550° C. for 6 hours.

Figure 4:
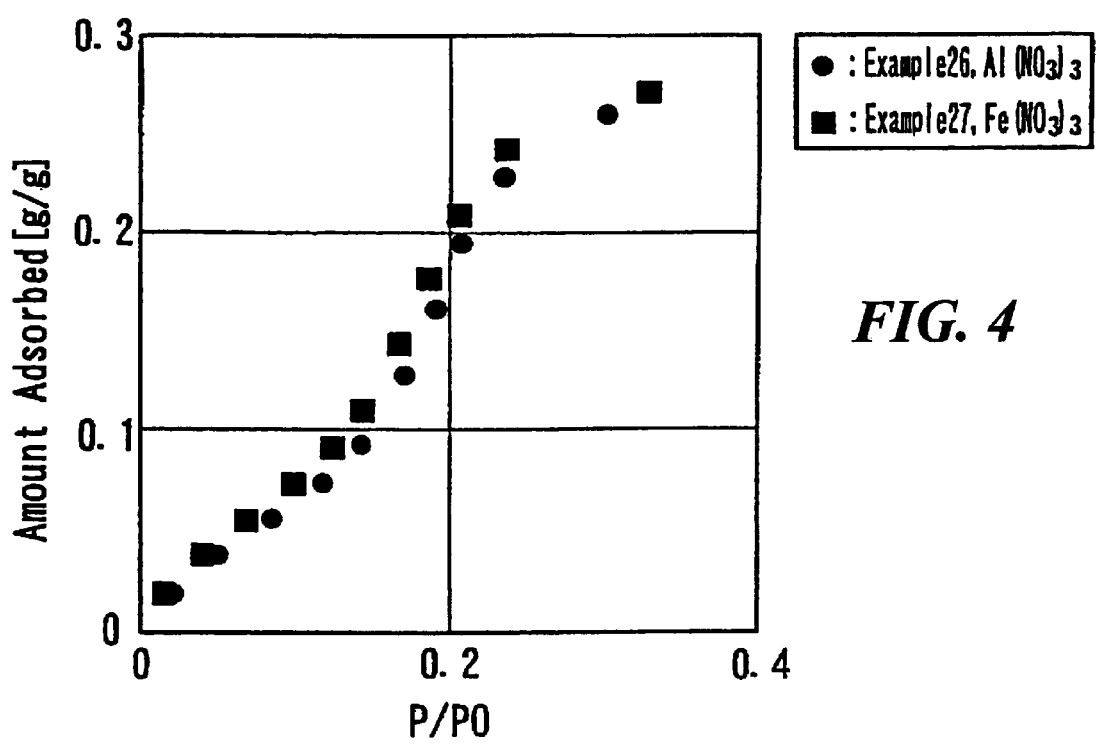
FIG. 4 shows water vapor adsorption isotherm curves of the porous materials of Example 26 and 27.

Then, 0.5 g of the powder was immersed in 20 g of an aqueous solution of 0.005 mol/l aluminum nitrate ($Al(NO)_3$) at 50° C. for 20 hours. After being filtered, the obtained powder was again heated at 550° C. for 6 hours. After the powder was immersed in hot water at 80° C. for 24 hours, the vapor adsorption isotherm curve was measured. The vapor adsorption quantities at $P/P0=0.10$ and $P/P0=0.25$ were 0.07 g/g and 0.24 g/g, respectively. The vapor adsorption isotherm curve is illustrated in FIG. 4.

Example 27

After 1.54 g of decyltrimethylammonium bromide, 2.28 g of 1N sodium hydroxide, 72.7 g of water, and 25 g of methanol were mixed, 1.32 g of tetramethoxysilane (TMOS) was added to precipitate a porous body-surfactant composite. After being stirred for 8 hours at a room temperature, the resultant mixture was left still overnight and then filtration under a reduced pressure and re-dispersion in water were repeated two times. After again being filtered under a reduced pressure, the obtained product was dried out at 45° C. for 3 days. The resultant powder was heated at 550° C. for 6 hours to remove the surfactant existing in the fine pores of the powder.

Then, 0.5 g of the powder was immersed in 20 g of an aqueous solution of 0.005 mol/l ferric nitrate ($Fe(NO)_3$) at 50° C. for 20 hours. After being filtered, the obtained powder was again heated at 550° C. for 6 hours. After the powder was immersed in hot water at 80° C. for 24 hours, the vapor adsorption isotherm curve was measured. The vapor adsorption quantities at $P/P0=0.10$ and $P/P0=0.25$ were 0.07 g/g and 0.25 g/g, respectively. The vapor adsorption isotherm curve is illustrated in FIG. 4.

Example 28

After 3.78 g of octyltrimethylammonium bromide, 2.28 g of 1N sodium hydroxide, 92.7 g of water, and 5 g of methanol were mixed, 1.32 g of tetramethoxysilane (TMOS) was added to precipitate a porous-surfactant composite. After being stirred for 8 hours at a room temperature, the resultant mixture was left still overnight and then filtration under a reduced pressure and re-dispersion in water were repeated two times. After again being filtered under a reduced pressure, the obtained product was dried out at 45° C. for 3 days. The resultant powder was heated at 550° C. for 6 hours.

Then, 0.5 g of the powder was immersed in 20 g of an aqueous solution of 0.005 mol/l ammonium titanyl oxalate at 50° C. for 20 hours. After being filtered, the obtained powder was again heated at 550° C. for 6 hours.

After the powder was immersed in hot water at 80° C. for 24 hours, the vapor adsorption isotherm curve was measured. The vapor adsorption quantities at $P/P0=0.10$ and $P/P0=0.25$ were 0.09 g/g and 0.21 g/g, respectively.

Example 29

After 154 g of decyltrimethylammonium bromide, 2.28 g of 1N sodium hydroxide, 72.7 g of water, and 25 g of methanol were mixed, 1.32 g of tetramethoxysilane (AMOS) was added to precipitate a porous-surfactant composite. After being stirred for 8 hours at a room temperature, the resultant mixture was left still overnight and then filtration under a reduced pressure and re-dispersion in water were repeated two times. Again, after being filtered under a reduced pressure, the obtained product was dried out at 45° C. for 3 days. The resultant powder was heated at 550° C. for 6 hours to remove the surfactant existing in the fine pores of the powder.

Then, 0.5 g of the powder was immersed in 20 g of an aqueous solution of 0.01N acetic acid at 50° C. for 20 hours. After being filtered, the obtained powder was again heated at 550° C. for 6 hours.

After the powder was immersed in hot water at 80° C. for 24 hours, the vapor adsorption isotherm curve was measured. The vapor adsorption quantities at $P/P0=0.10$ and $P/P0=0.25$ were 0.08 g/g and 0.23 g/g, respectively.

Examples Based Upon Representative Method (5)

Example 30

After 1.54 g of decyltrimethylammonium bromide, 2.28 g of 1N sodium hydroxide, 71.7 g of water, and 25 g of methanol were mixed, 0.046 g of sodium aluminate (NaAlO$_2$, 78% purity), which was dissolved in 1 g of water, was added. Further, 1.25 g of tetraethoxysilane (TMOS) (mole ratio of Si/Al would be 95/5) was added to precipitate a porous material-surfactant composite. After being stirred for 8 hours at a room temperature, the resultant mixture was left overnight and then filtration under a reduced pressure and re-dispersion in water were repeated two times. After again being filtered under a reduced pressure, the obtained product was dried out at 45° C. for 3 days. The powder was heated at 550° C. for 6 hours to remove the surfactant in the fine pores.

Figure 5:
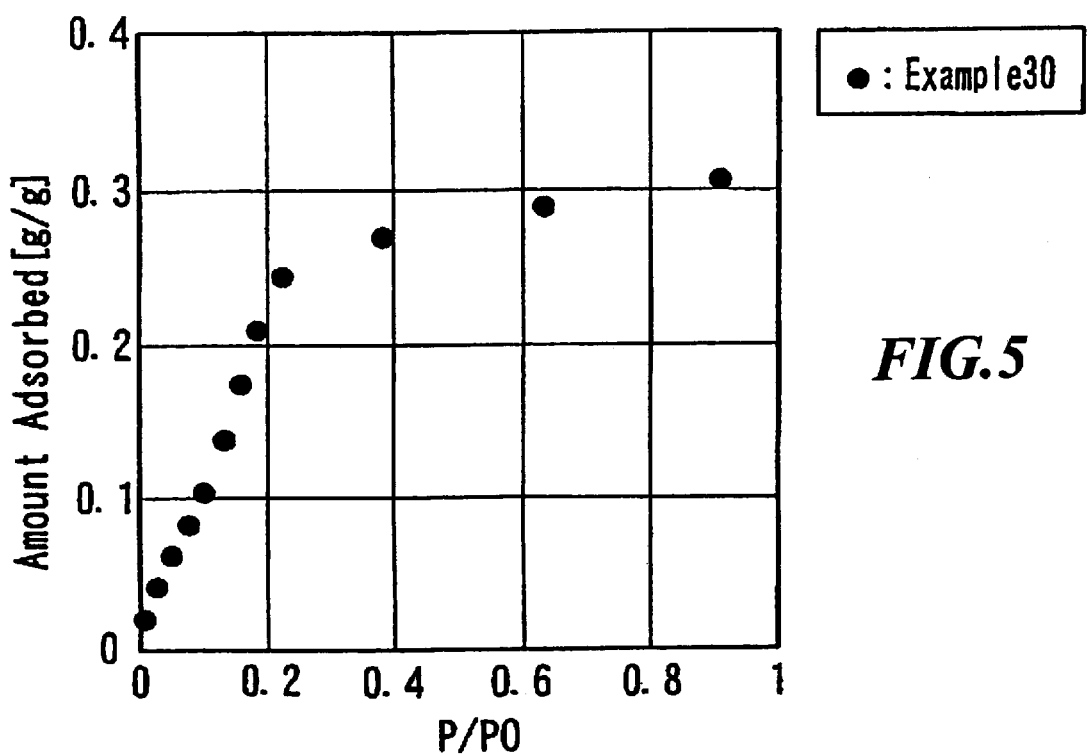
FIG. 5 shows water vapor adsorption isotherm curve of the porous materials of Example 30.

After the powder was immersed in water overnight, the vapor adsorption isotherm curve was measured. As a result, as shown in FIG. 5, the vapor adsorption quantities at P/P0=0.08 and P/P0=0.18 were 0.07 g/g and 0.21 g/g, respectively.

Figure 6:
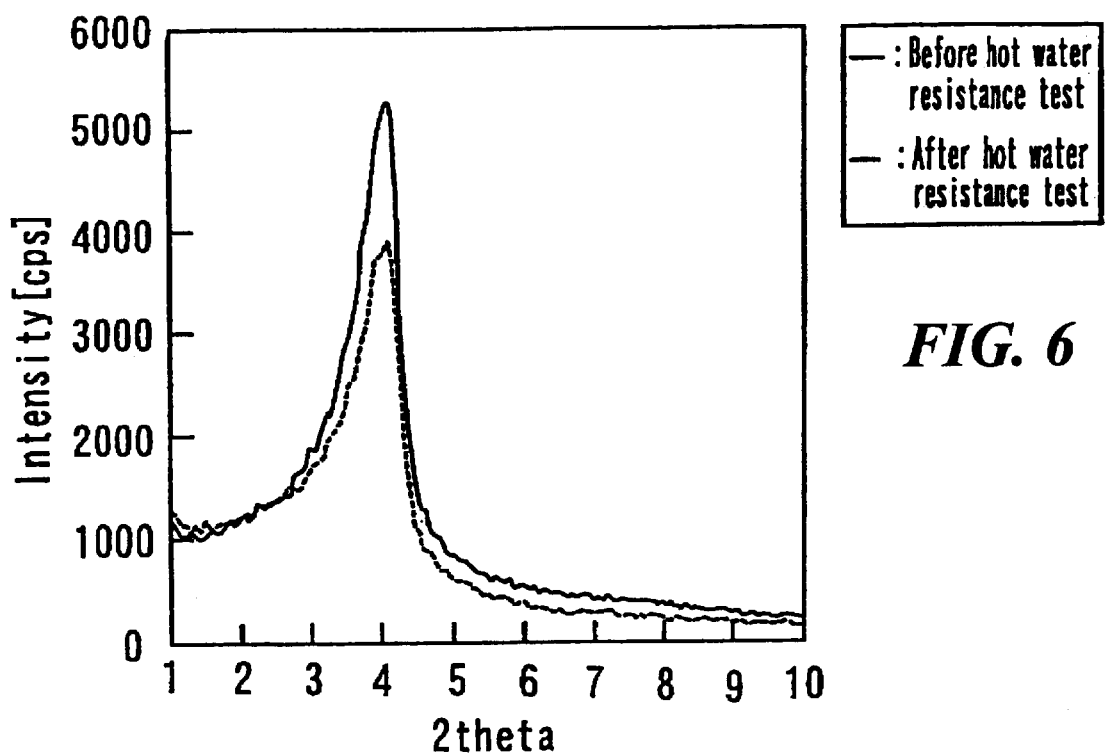
FIG. 6 shows XRD patterns of before and after a hot water resistance test of the porous material synthesized in Example 30.

Also, a 24-hour hot water resistance test of the powder was carried out by immersing the powder in hot water at 80° C. for 24 hours. X-ray diffraction patterns before and after the test are illustrated in FIG. 6 and the peak d100 attributed to the gaps between neighboring fine pores can be found existing and no fine pore destruction is found.

Example 31

After 1.54 g of decyltrimethylammonium bromide, 2.28 g of 1N sodium hydroxide, 70.7 g of water, and 25 g of methanol were mixed, 0.109 g of sodium aluminate (NaAlO$_2$, 78% purity), which was dissolved in 2 g of water, was added and then 1.16 g (mole ratio of Si/Al would be 88/12) of tetramethoxysilane (TMOS) was added to precipitate a porous material-surfactant composite. After being stirred for 8 hours at a room temperature, the resultant mixture was left overnight and then filtration under a reduced pressure and re-dispersion in water were repeated two times. After again being filtered under a reduced pressure, the obtained product was dried at 45° C. for 3 days. The surfactant in the fine pores of the powder was removed by heating the powder at 550° C. for 6 hours.

After the powder was immersed in water of 80° C. overnight, the vapor adsorption isotherm curve was measured. The vapor adsorption quantities at P/P0=0.08 and P/P0=0.18 were 0.1 g/g and 0.14 g/g, respectively.

Example 32

After 1.54 g of decyltrimethylammonium bromide, 2.28 g of 1N sodium hydroxide, 70.7 g of water, and 25 g of methanol were mixed, 0.074 g of sodium aluminate (NaAlO$_2$, 78% purity), which was dissolved in 2 g of water, was added and then 1.21 g (mole ratio of Si/Al would be 92/8) of tetramethoxysilane (TMOS) was added to precipitate a porous body-surfactant composite. After being stirred for 8 hours at a room temperature, the resultant mixture was left overnight and then filtration under a reduced pressure and re-dispersion in water were repeated two times. After again being filtered under a reduced pressure, the obtained product was dried at 45° C. for 3 days. The surfactant in the fine pores of the powder was removed by heating the powder at 550° C. for 6 hours.

After the powder was immersed in water overnight, the vapor adsorption isotherm curve was measured. The vapor adsorption quantities at P/P0=0.08 and P/P0=0.18 were 0.06 g/g and 0.18 g/g, respectively.

Also, a 24-hour hot water resistance test of the powder was carried out by immersing the powder in hot water at 80° C. for 24 hours. The peak d100 attributed to the gaps between neighboring fine pores can be found in the x-ray diffraction pattern after the test, which suggests no fine pore destruction.

Example 33

After 1.54 g of decyltrimethylammonium bromide, 2.28 g of 1N sodium hydroxide, 71.7 g of water, and 25 g of methanol were mixed, 0.018 g of sodium aluminate (NaAlO$_2$, 78% purity), which was dissolved in 1 g of water, was added and then 1.29 g (mole ratio of Si/Al would be 98/2) of tetraethoxysilane (AMOS) was added to precipitate a porous material-surfactant composite. After being stirred for 8 hours at a room temperature, the resultant mixture was left overnight and then filtration under a reduced pressure and re-dispersion in water were repeated two times. After again being filtered under a reduced pressure, the obtained product was dried at 45° C. for 3 days. The surfactant in the fine pores of the powder was removed by heating the powder at 550° C. for 6 hours.

After the powder was immersed in water overnight, the vapor adsorption isotherm curve was measured. The vapor adsorption quantities at P/P0=0.08 and P/P0=0.18 were 0.06 g/g and 0.20 g/g, respectively.

Also, a 24-hour hot water resistance test of the powder was carried out by immersing the powder in hot water at 80° C. for 24 hours. The peak d100 attributed to the gaps between neighboring fine pores can be found in the x-ray diffraction pattern after the test, which suggests no fine pore destruction.

Other techniques for forming porous materials are taught in U.S. Pat. Nos. 5,508,081, 5,707,598, 5,382,558, 5,750,085, 5,768,085 and 6,248,686, all of which are incorporated herein by reference in their entirety.

This application is based on Japanese Patent Application 11-266136, filed Sep. 20, 1999, and 2000–284216, filed Sep. 19, 2000, the entire contents of which are incorporated herein by reference, the same as if set forth at length.

What is claimed is:

1. A porous material comprising a silicate-based skeleton and having a water vapor adsorption capacity that is less than or equal to 0.1 g/g at a relative vapor pressure of 25%, and greater than or equal to 0.4 g/g at a relative vapor pressure of 40%, wherein the silicate-based skeleton contains silicon atoms in which optionally some or all of the silicon atoms have been replaced with other metal atoms.

2. A porous material comprising a silicate-based skeleton and having a water vapor adsorption capacity that is less than or equal to 0.1 g/g at a relative vapor pressure of 30%, and greater than or equal to 0.48 g/g at a relative vapor pressure of 50%, wherein the silicate-based skeleton contains silicon atoms in which optionally some or all of the silicon atoms have been replaced with other metal atoms.

3. A method for forming a porous material comprising:
condensing a silicate-based skeleton starting material for the porous material, in the presence of a surfactant, in a solution having a concentration of the silicate-based skeleton starting material that is less than or equal to 0.4 mol/L and a molar ratio of the surfactant to the silicate-based skeleton starting material that is greater than or equal to 0.05 and less than or equal to 50, thereby forming a condensate and
removing the surfactant from said condensate, wherein the silicate-based skeleton contains silicon atoms in which optionally some or all of the silicon atoms have been replaced with other metal atoms.

4. A method for forming a porous material comprising:
mixing a surfactant and a silicate-based skeleton starting material for the porous material in the presence of an aqueous solvent having a pH value of greater than or equal to 10, thereby forming a liquid mixture,
reducing the pH of the liquid mixture to obtain a pH value that is greater than or equal to 9,
separating a solid fraction from the liquid mixture formed after the pH is reduced and
removing the surfactant from the solid fraction, wherein the silicate-based skeleton contains silicon atoms in which optionally some or all of the silicon atoms have been replaced with other metal atoms.

5. A method as in claim 4, wherein the liquid mixture has a concentration of the silicate-based skeleton starting material of less than 0.4 mol/L and a molar ratio of the surfactant to the silicate-based skeleton starting material of greater than 0.05 and less than 50.

6. A method as in claim 4, wherein the surfactant comprises octyltrimethylammonium halide.

7. A method as in claim 4, wherein the surfactant comprises decyltrimethylammonium halide.

8. A method as in claim 4, wherein the surfactant comprises dodecyltrimethylammonium halide.

9. A method as in claim 4, wherein the surfactant comprises tetradecyltrimethylammonium halide.

10. A method as in claim 4, wherein the surfactant comprises hexadecyltrimethylammonium halide.

11. A porous material comprising a silicate-based skeleton wherein, after immersion in hot water having a temperature of about 80° C. for about 24 hours, the porous material has a water vapor adsorption capacity that is less than or equal to 0.1 g/g at a relative vapor pressure of 10%, and greater than or equal to 0.2 g/g at a relative vapor pressure of 25%, wherein the silicate-based skeleton contains silicon atoms in which optionally some or all of the silicon atoms have been replaced with other metal atoms, and wherein the inflection point of a water adsorption isotherm curve covering a relative water vapor pressure from 0 to 100% of the porous material measured at 25° C. is between 10%, and 25%.

12. A porous material comprising a silicate-based skeleton, wherein, after immersion in hot water having a temperature of about 80° C. for about 24 hours, the amount of adsorbed water vapor differs by greater than or equal to 0.12 g/g between any two points within a range of relative vapor pressure from greater than or equal to 10% to less than or equal to 25%, wherein the silicate-based skeleton contains silicon atoms in which optionally some or all of the silicon atoms have been replaced with other metal atoms, and wherein the inflection point of a water adsorption isotherm curve covering a relative water vapor pressure from 0 to 100% of the porous material measured at 25° C. is between 10% and 25%.

13. A method for forming a porous material comprising:
condensing a silicate-based skeleton starting material for the porous material in a solution having a concentration of the silicate-based skeleton starting material that is less than or equal to 0.4 mol/L and a molar ratio of the surfactant to the silicate-based skeleton starting material of greater than or equal to 0.07 and less than or equal to 25, thereby forming a condensate,
removing the surfactant from the condensate, and
contacting the condensate with a solution of an acid or a salt of an acid and a metal ion having a valence of greater than or equal to three, wherein the silicate-based skeleton contains silicon atoms in which optionally some or all of the silicon atoms have been replaced with other metal atoms.

14. A method as in claim 13, wherein the metal ion is $Fe^{3+}$.

15. A porous material comprising a silicate-based skeleton and having a water vapor adsorption capacity that is less than or equal to 0.1 g/g at a relative vapor pressure of 8%, and greater than or equal to 0.18 g/g at 18%, wherein the silicate-based skeleton contains silicon atoms in which optionally some or all of the silicon atoms have been replaced with other metal atoms, and wherein the inflection point of a water adsorption isotherm curve covering a relative water vapor pressure from 0 to 100% of the porous material measured at 25° C. is between 8% and 18%.

16. A porous material as in claim 15, wherein the silicate-based skeleton comprises Si and Al.

17. A porous material as in claim 16, wherein the molar ratio of Al to the total molar amount of Si and Al in the skeleton is less than 0.12.

18. A porous material as in claim 15, wherein the porous material retains said water vapor adsorption capacities after immersion in hot water of about 80° C. for about 24 hours.

19. A porous material comprising a silicate-based skeleton, wherein the amount of adsorbed water vapor differs by greater than or equal to 0.12 g/g between any two points within a range of relative vapor pressure from greater than or equal to 8% to less than or equal to 18%, wherein the silicate-based skeleton contains silicon atoms in which optionally some or all of the silicon atoms have been replaced with other metal atoms, and wherein the inflection point of a water adsorption isotherm curve covering a relative water vapor pressure from 0 to 100% of the porous material measured at 25° C. is between 8% and 18%.

20. A porous material as in claim 19, wherein the silicate-based skeleton comprises Si and Al.

21. A porous material as in claim 20, wherein the molar ratio of Al to the total molar amount of Si and Al in the skeleton is less than 0.12.

22. A porous material as in claim 19, wherein the porous material retains said water vapor adsorption capacities after immersion in hot water of about 80° C. for about 24 hours.

23. A method for forming a porous material comprising:
condensing a silicate-based skeleton starting material for the porous material in a solution having a concentration of the silicate-based skeleton starting material that is less than or equal to 0.4 mol/L and has molar ratio of the surfactant to the silicate-based skeleton starting material of greater than or equal to 0.07 and less than or equal to 25, thereby forming a condensate, wherein said silicate-based skeleton starting material comprises Si and Al and
removing the surfactant from the condensate, wherein the silicate-based skeleton contains silicon atoms in which optionally some or all of the silicon atoms have been replaced with other metal atoms.

24. A method as in claim 23, wherein the molar ratio of Al to the total molar amount of Si and Al in the silicate-based skeleton starting material is between 0.0005–0.2.

25. A porous material comprising a silicate-based skeleton and having a water vapor adsorption capacity that is less than or equal to 0.1 g/g at a relative vapor pressure of 8%, and greater than or equal to 0.18 g/g at 18%, wherein the silicate-based skeleton contains silicon atoms in which optionally some or all of the silicon atoms have been replaced with other metal atoms, wherein the silicate-based skeleton comprises Si and Al, and wherein the molar ratio of Al to the total molar amount of Si and Al in the skeleton is greater than 0.02 and less than 0.06.

26. A porous material comprising a silicate-based skeleton, wherein the amount of adsorbed water vapor differs by greater than or equal to 0.12 g/g between any two points within a range of relative vapor pressure from greater than or equal to 8% to less than or equal to 18%, wherein the silicate-based skeleton contains silicon atoms in which optionally some or all of the silicon atoms have been replaced with other metal atoms, wherein the silicate-based skeleton comprises Si and Al, and wherein the molar ratio of Al to the total molar amount of Si and Al in the skeleton is greater than 0.02 and less than 0.06.

27. A porous material comprising a silicate-based skeleton and having a water vapor adsorption capacity of less than 0.1 g/g at a relative vapor pressure of 8%, and greater than 0.2 g/g at a relative vapor pressure of 18%, wherein the silicate-based skeleton contains silicon atoms in which optionally some or all of the silicon atoms have been replaced with other metal atoms, and wherein the inflection point of a water adsorption isotherm curve covering a relative water vapor pressure from 0 to 100% of the porous material measured at 25° C. is between 8% and 18%.

28. A porous material as in claim 27, wherein the porous material retains said water vapor adsorption capacities after immersion in hot water of about 80° C. for about 24 hours.

* * * * *